(12) United States Patent
Lee et al.

(10) Patent No.: US 7,545,102 B2
(45) Date of Patent: Jun. 9, 2009

(54) SINGLE-STAGE ELECTRONIC BALLAST DEVICE

(75) Inventors: Ching-Ran Lee, Hsinchu (TW); Hwei-Shung Chung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 57 days.

(21) Appl. No.: 11/644,946

(22) Filed: Dec. 26, 2006

(65) Prior Publication Data

US 2008/0018265 A1 Jan. 24, 2008

(30) Foreign Application Priority Data

Jul. 20, 2006 (TW) ............................... 95126586 A

(51) Int. Cl.
*H05B 37/00* (2006.01)
(52) U.S. Cl. .................... 315/200 R; 315/247; 315/246; 315/205; 315/207
(58) Field of Classification Search ................. 315/247, 315/246, 224, 225, 209 R, 200 R, 201–207
See application file for complete search history.

(56) References Cited

U.S. PATENT DOCUMENTS

| | | | | |
|---|---|---|---|---|
| 5,172,308 A | * | 12/1992 | Tohya | ........................ 363/16 |
| 5,510,974 A | * | 4/1996 | Gu et al. | ..................... 363/134 |
| 2004/0125625 A1 | * | 7/2004 | Nillesen | ..................... 363/125 |

* cited by examiner

*Primary Examiner*—Tuyet Vo
(74) *Attorney, Agent, or Firm*—Birch, Stewart, Kolasch & Birch, LLP

(57) ABSTRACT

A single-stage electronic ballast device outputs a square wave current to drive an HID lamp, which includes a rectifying and power factor correction unit, a bridge converter and a controller circuit. The rectifying and power factor correction unit has an input connected to an AC power source to rectify an AC power to a DC power. The bridge converter comprises two bridge arms formed by four switches, load terminals defined by midpoints of the two bridge arms and the HID lamp is connected between the load terminals. The bridge converter converts DC current to square wave current to drive the HID lamp with power control. The load terminals are selectively connected to output of the rectifying and power factor correction unit to adjust waveform of input current for higher power factor. The controller circuit has output connected to DC link voltage terminal and load terminal of the bridge converter.

8 Claims, 23 Drawing Sheets

SINGLE-STAGE ELECTRONIC BALLAST DEVICE

FIELD OF THE INVENTION

The present invention relates to a single-stage electronic ballast device, especially to a high power factor single-stage electronic ballast device for outputting a low frequency square wave current to drive HID lamp.

DESCRIPTION OF PRIOR ART

High intensity discharge (HID) lamps have the advantage of ultra brightness, power saving and low thermal energy, and are widely recognized as high quality lighting source. The nowadays electronic ballast for HID lamp can be operated with high-frequency sinusoidal wave current source or low-frequency square wave current source.

FIG. 1 shows the circuit diagram of the electronic ballast of high-frequency sinusoidal wave current source, which has a simple circuit structure. The electronic ballast of high-frequency sinusoidal wave current source shown in this figure comprises a first-stage power factor correction unit 11 and a second-stage DC-AC converter 12. A resonance circuit 13 is used to reduce switching loss of switching elements Q1 and Q2. Therefore, the overall conversion efficiency can be increased. However, the above-mentioned electronic ballast suffers to the problem of acoustic resonance, especially to lamp 10 of lower rated power. This problem is difficult to solve even through complicated detection or control is used. Moreover, the HID lamp operated at high frequency has poor luminous efficiency.

Therefore, most of the commercially available HID lamps adopt low-frequency square wave current source, where lamp is operated in frequency below 1 KHz to prevent acoustic resonance. The HID lamps with low-frequency square wave current source generally has circuit structure of multiple stages. FIG. 2 shows the circuit diagram of a three-stage electronic ballast for HID lamp, where a three-stage switching circuit is connected to a rectifier to provide conversion for power source.

The three-stage switch circuit comprises a first-stage power factor correction unit 21, a second-stage high-frequency clipping limiter 22 and a third-stage low-frequency converter 23. The first-stage power factor correction unit 21 comprises a DC-DC converter, which is generally a boost converter or a buck-boost converter. The second-stage high-frequency clipping limiter 22 is generally a buck converter to regulate output. The third-stage low-frequency converter 23 is a full-bridge converter to convert a DC current to a low-frequency square wave current for outputting it to the lamp 10.

The current multiple-stage electronic ballast generally has following drawbacks:

1. The circuit is complicated with lots of active switching elements.
2. The overall conversion efficiency is reduced due to power loss of multi-stage conversion.
3. The circuit might malfunction and the circuit reliability is reduced due to the switching noise of the multi-stage circuit.
4. The controllers are complicated and difficult to integrate because circuit of each stage has its own controller.
5. Lots of detection and decision are needed because circuit of each stage has its own protection circuit.

Moreover, a two-stage electronic ballast circuit for outputting low frequency square wave current is developed, where high-frequency clipping limiter and low-frequency full-bridge converter are integrated into a single stage and the first-stage power factor correction unit is separately provided. However, the relevant drawbacks still exist.

SUMMARY OF THE INVENTION

It is the object of the present invention to provide a single-stage electronic ballast device for outputting a low frequency square wave current to drive at least one HID lamp. The circuit complexity and use of active elements can be reduced. The conversion loss and electromagnetic interference of multi-stage circuit can be reduced. Malfunction caused by current switching can also be prevented.

Accordingly, the present invention provides a single-stage electronic ballast device outputting a square wave current to drive a HID lamp, which comprises a rectifying and power factor correction unit, a bridge converter and a controller circuit. The rectifying and power factor correction unit has an input connected to an AC power source to rectify an AC power to a DC power. The rectifying and power factor correction unit further provides input current path and energy storing unit. The bridge converter comprises two bridge arms formed by four switches, load terminals defined by midpoints of the two bridge arms and an HID lamp connected between the load terminals. The bridge converter converts DC current to square wave current to drive the HID lamp with power control. The load terminals are selectively connected to output of the rectifying and power factor correction unit to adjust waveform of input current for higher power factor. The controller circuit has input connected from DC link voltage terminal and load terminal of the bridge converter, and output connected to the four switches to drive the four switches with PWM control and protection, whereby the bridge converter outputs a square wave current, and resulting in a high power factor to the input current.

According to one aspect of the present invention, an output filter is provided between the output terminal of the bridge converter and the HID lamp to filter off harmonic currents in the output current.

According to another aspect of the present invention, the rectifying and power factor correction unit comprises at least one power factor correction inductor $L_{PFC}$ connected to one set of rectifier.

According to still another aspect of the present invention, an input filter is provided between the rectifying and power factor correction unit and the AC power source to filter off harmonic currents in the input current.

According to still another aspect of the present invention, the controller circuit comprises a DC bus, a first sensor, a second sensor, a reference voltage generator, a first amplifier, a second amplifier, a first comparator, a second comparator, a logic circuit, a driver and a square wave generator. The multi-stage circuits are integrated and a single PWM controller is provided for output, input, regularization and illumination control simultaneously. The detection and decision can be performed by a single circuit.

BRIEF DESCRIPTION OF DRAWING

The features of the invention believed to be novel are set forth with particularity in the appterminaled claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
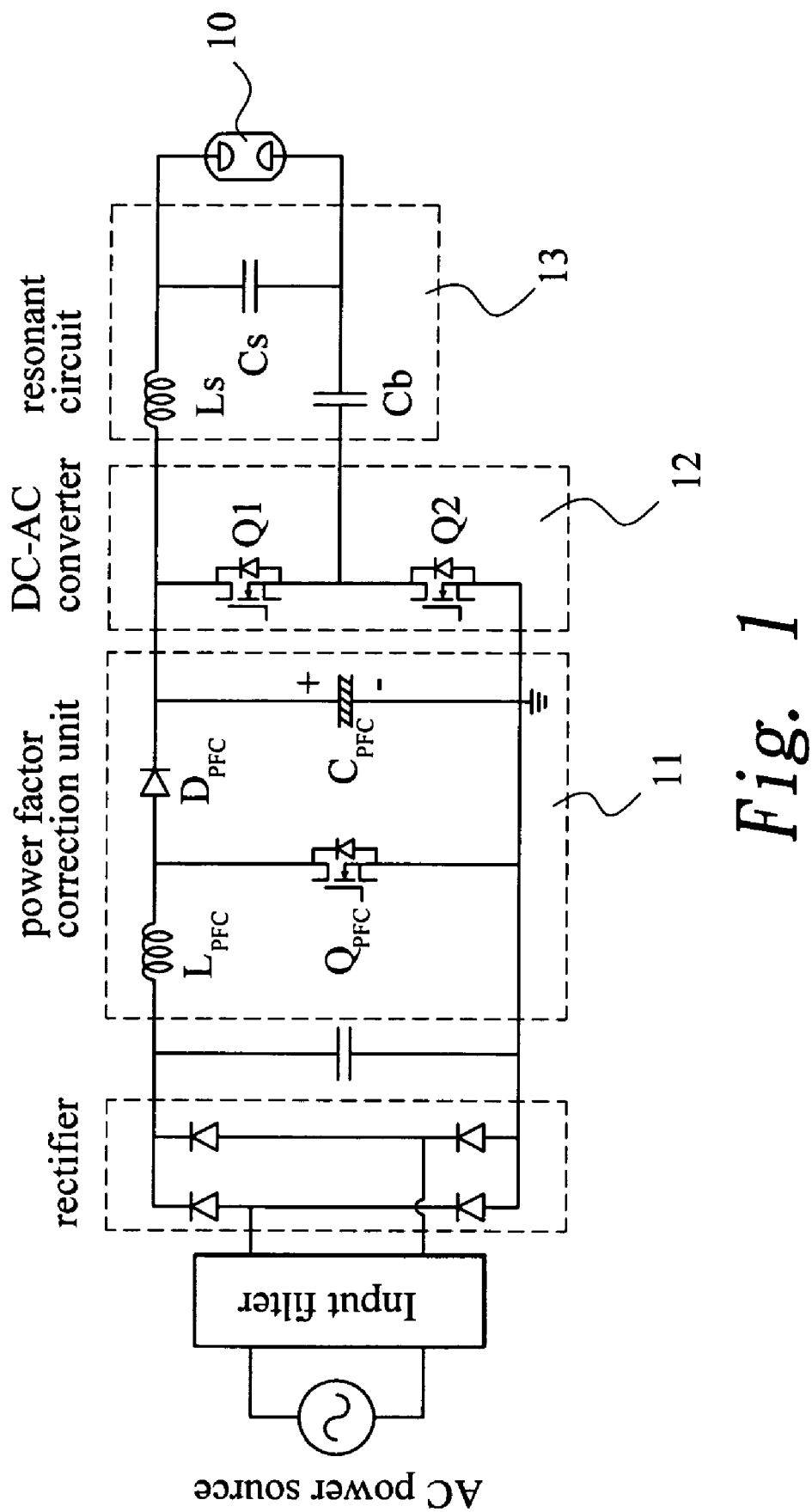
FIG. 1 shows the circuit diagram of a prior art electronic ballast of high-frequency sinusoidal wave current source.
Figure 2:
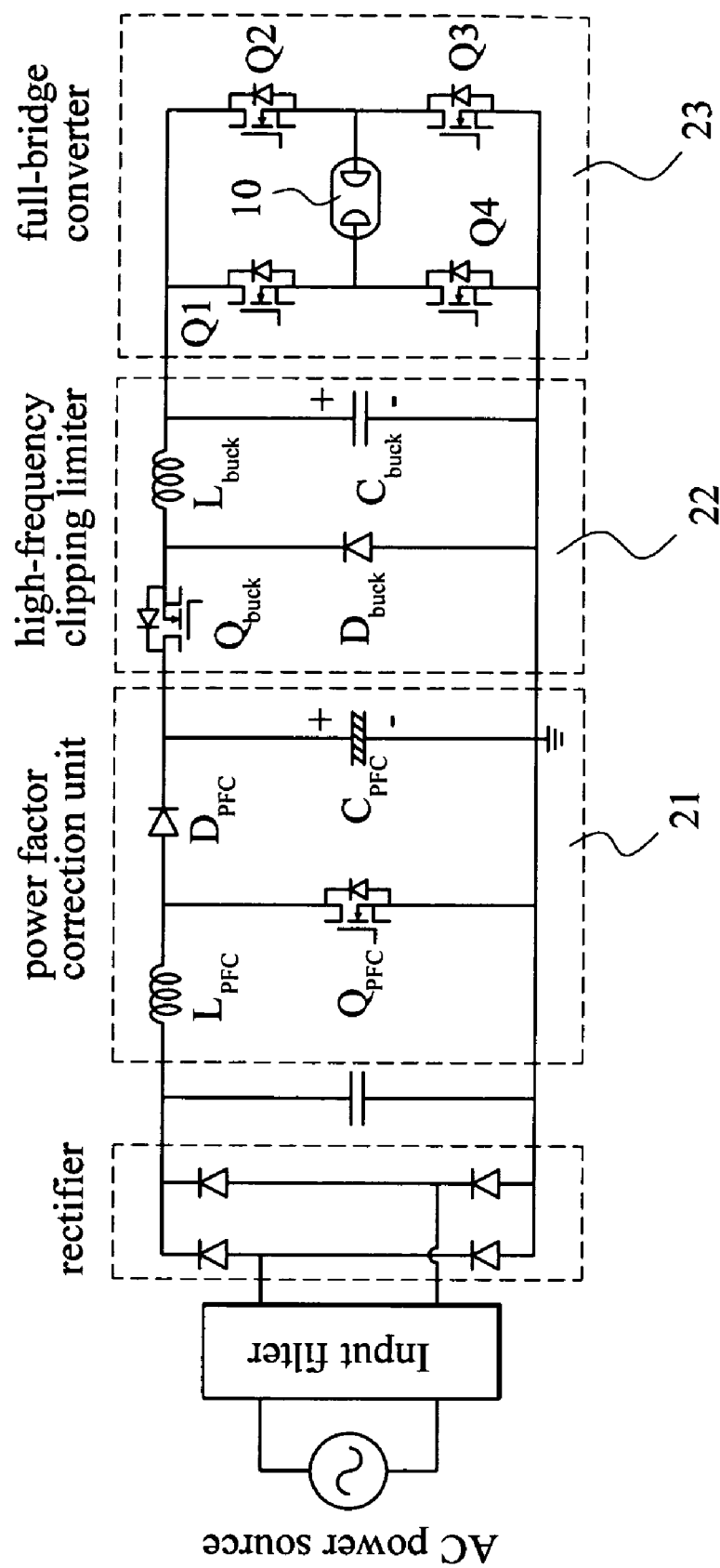
FIG. 2 shows the circuit diagram of a prior art three-stage electronic ballast for HID lamp.
Figure 3:
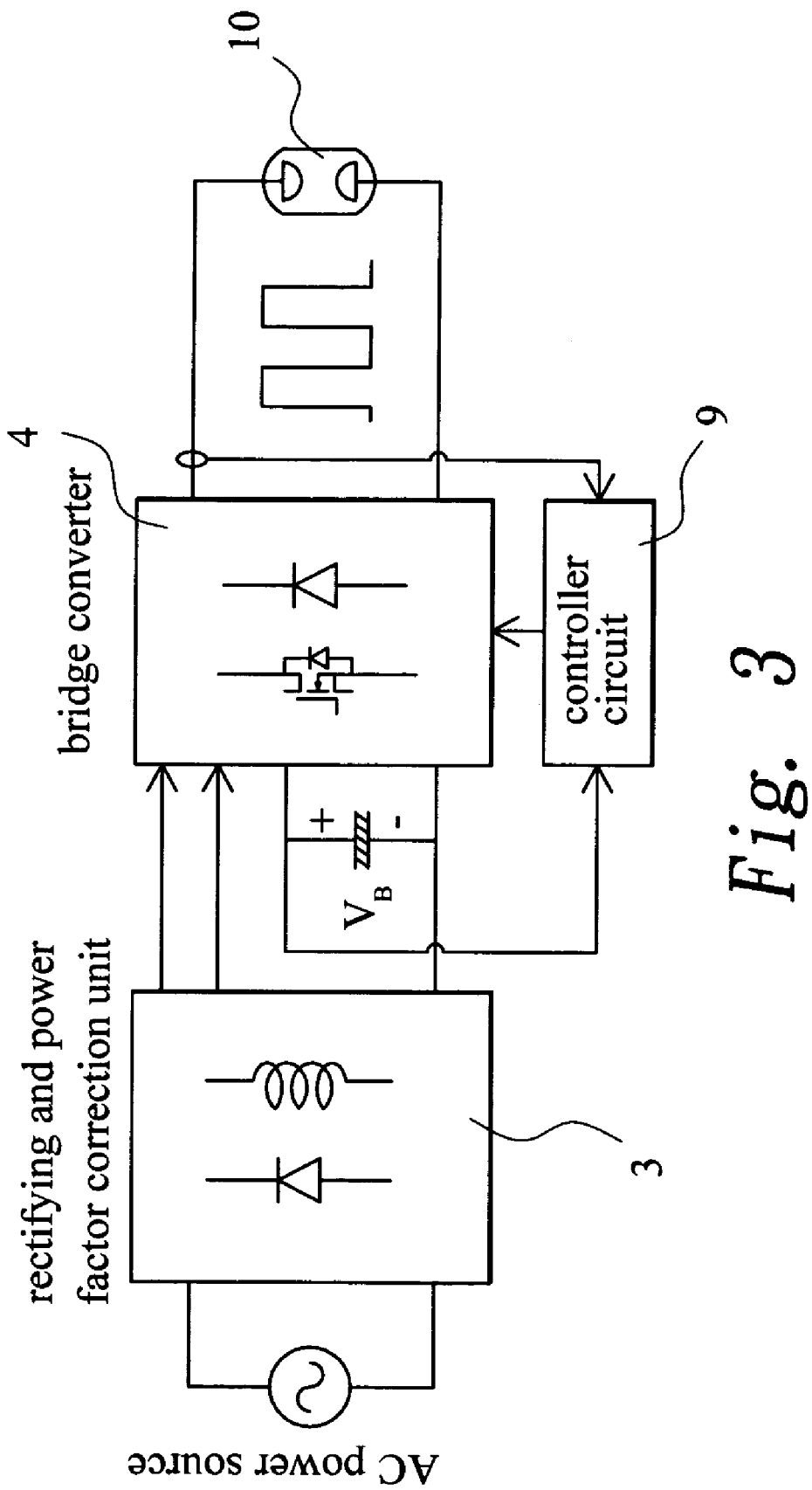
FIG. 3 is a block diagram of the single-stage electronic ballast of the present invention.

FIG. 3 is a block diagram of the single-stage electronic ballast. FIG. 4(a) to FIG. 4(e) shows the rectifying and power factor correction circuit according to five preferred embodiment of the present invention. The single-stage electronic ballast according to the present invention outputs low-frequency square wave and comprises mainly a bridge converter 4 and a rectifying and power factor correction unit 3.

The bridge converter 4 comprises four switching units Q1-Q4 to form arms of a full bridge. The connection node of the first switching unit Q1 and the fourth switching unit Q4 forms a first load terminal (node a). The connection node of the second switching unit Q2 and the third switching unit Q3 forms a second load terminal (node b). The connection node of the first switching unit Q1 and the second switching unit Q2 is connected to a positive node (+) of a DC link capacitor $C_B$. The connection node of the third switching unit Q3 and the fourth switching unit Q4 is connected to a negative node (−) of the DC link capacitor $C_B$ and is a common ground terminal.

As shown in FIGS. 4(a) to 4(e), when the first switching unit Q1 and the second switching unit Q2 are turned on, the voltages at the first load terminal (node a) and the voltage at the second load terminal (node b) are the same as that of DC link voltage $V_B$. When the third switching unit Q3 and the fourth switching unit Q4 are turned on, the voltage between nodes b-a is equal to zero.

In the present invention, the first load terminal and the second load terminal are designed to be the nodes a and b of the bridge, where node b is positive terminal of output voltage and node a is negative terminal of output voltage. The output load voltage $V_0$ can be the value of positive DC link voltage $V_B$, negative DC link voltage $-V_B$ or zero voltage by controlling conduction states of switches.

The above three voltage values alternatively appear between node a and node b by high frequency switching with carrier. The averaged value of the output voltage can be controlled by pulse width modulation (PWM). Therefore, output current and output power can also be changed. An output filter 5 is used to remove high frequency component to obtain low-frequency square wave current for the load. The output filter 5 comprises at least one filter inductor Ls in series with a filter capacitor Cs. The HID lamp is connected to the filter capacitor Cs in parallel to remove the high frequency harmonic portion in the output current.

As to power factor modification, in the present invention, the rectifier and the power factor modifier are integrated into a rectifying and power factor correction unit 3. The output of the rectifying and power factor correction unit 3 is electrically connected to the output load terminal of the bridge converter 4, namely the mid node a or b of the bridge arm. Therefore, the output voltage of the rectifying and power factor correction unit 3 will be the DC link voltage $V_B$ or zero voltage, depterminaling on the conduction states of the bridge. This is similar to the prior art active power factor correction circuit. Therefore, the power factor can be improved and the input power can be controlled by controlling the time period of DC link voltage and zero voltage.

In the five preferred embodiments shown in FIGS. 4(a) to 4(e), the output current path is built on the load terminal a or load terminal b. When the switching unit on the lower brand (the third switching unit Q3 or the fourth switching unit Q4) is turned on, the voltage at the load terminal corresponding to that brand is of low level. The power factor correction inductor $L_{PFC}$ is charging and the current is increased as shown in FIG. 5, where the output current waveform of the input filter of the present invention is shown.

Figure 6:
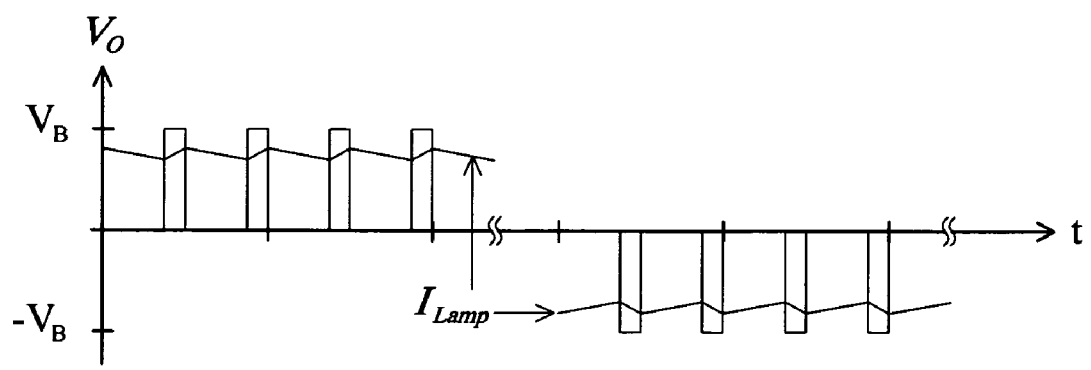
FIG. 6 shows the output voltage and current waveform of the present invention.

After that lower switching unit is turned off, the switching unit of the upper branch the first switching unit Q1 or the second switching unit Q2 is turned on naturally and the voltage at that load terminal is of high level. At this time, the power factor correction inductor $L_{PFC}$ is discharging and the current is reduced because it flows into the DC link capacitor $C_B$. The power factor can be corrected by controlling the on-time of the third switching unit Q3 and the fourth switching unit Q4. FIG. 6 shows the output voltage and current waveform, where the averaged value of output voltage can be changed by pulse width modulation.

In the present invention, two sensors are used to sense the DC voltage and the output current(or voltage), and both sensed signals feedback to a controller circuit 9. The two sensed signals are compared with a reference signal to perform pulse width modulation for the bridge converter. When the two sensed signals are higher than a preset value, the controller circuit can turn off input current or output current to protect the electronic ballast circuit of the present invention.

Figure 7:
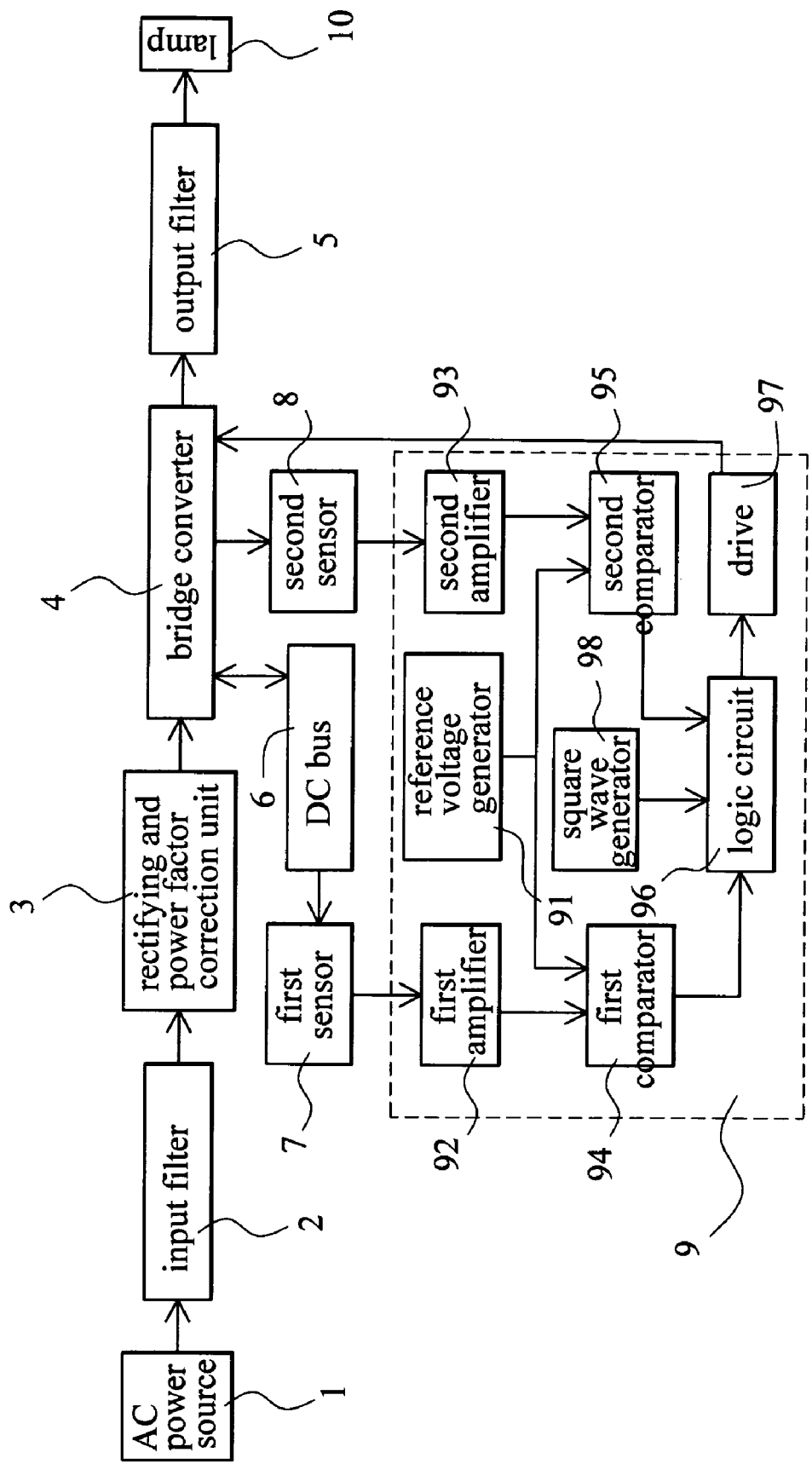
FIG. 7 shows a block diagram of a preferred embodiment of the present invention.
Figure 8:
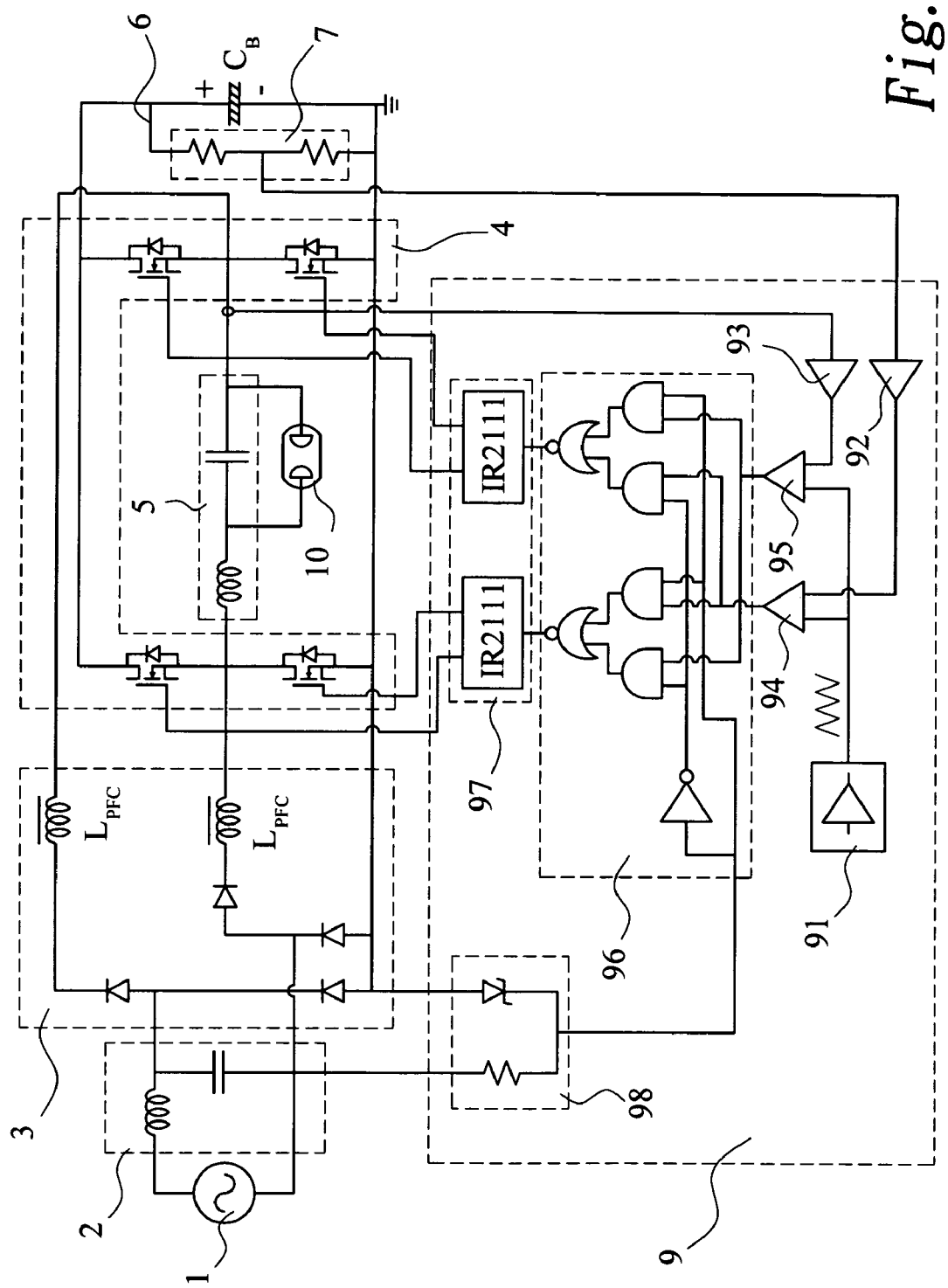
FIG. 8 shows the circuit diagram of a preferred embodiment of the present invention.
Figure 9A:
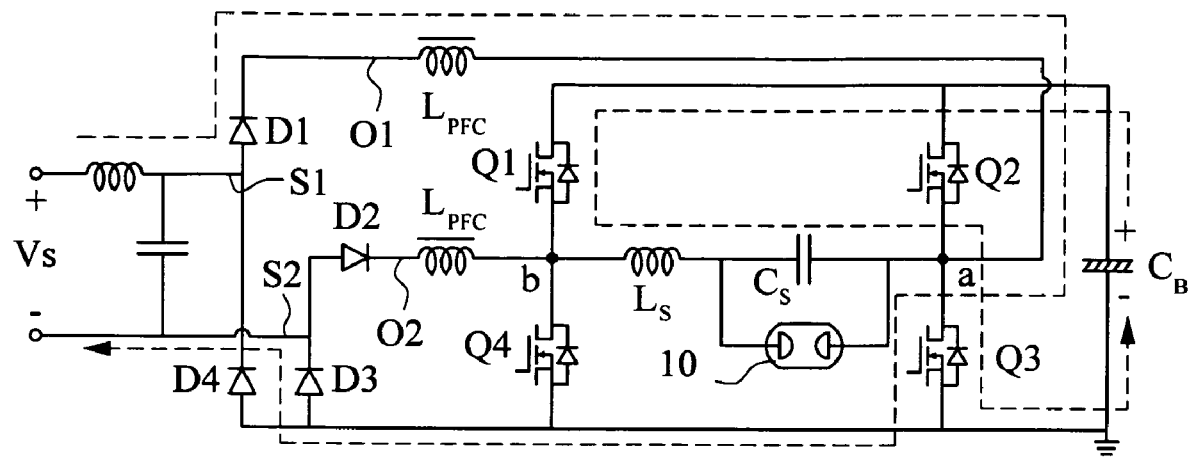
FIGS. 9(a) to 9(f) show the current path of the rectifying and power factor correction unit of the present invention in FIG. 4(a).
Figure 9B:
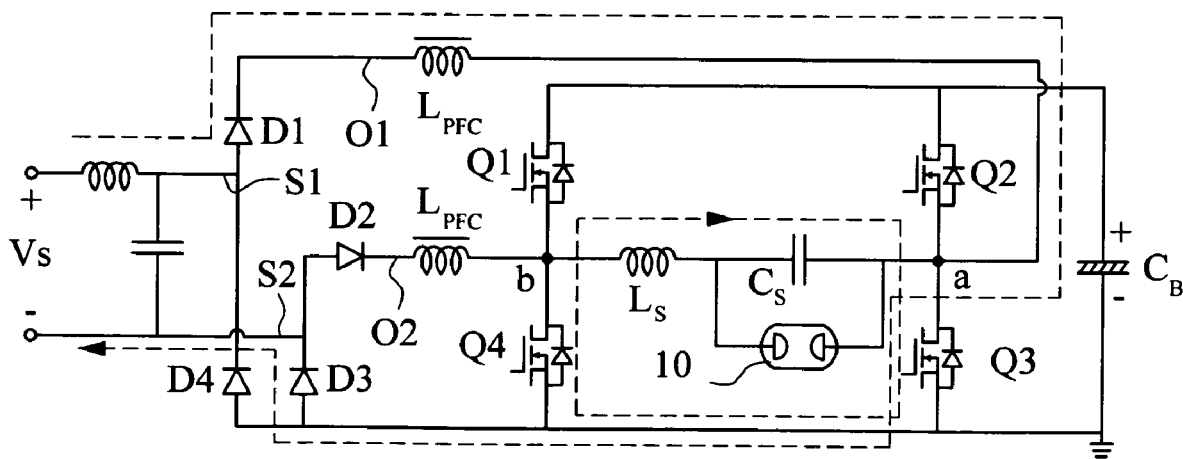
Figure 9C:
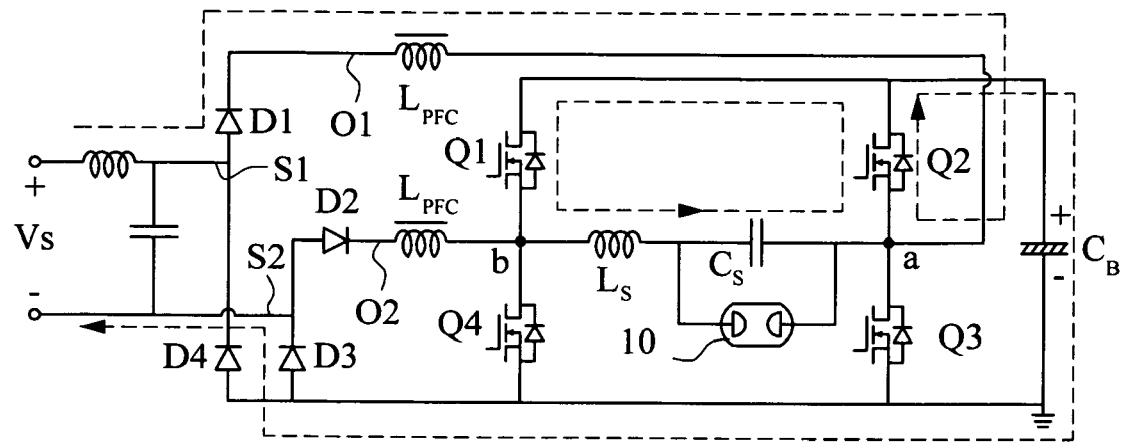
Figure 9D:
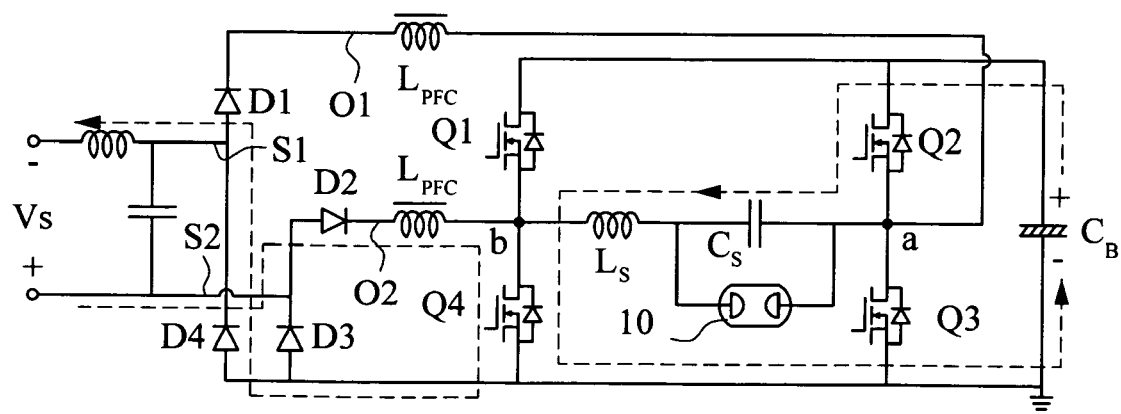
Figure 9E:
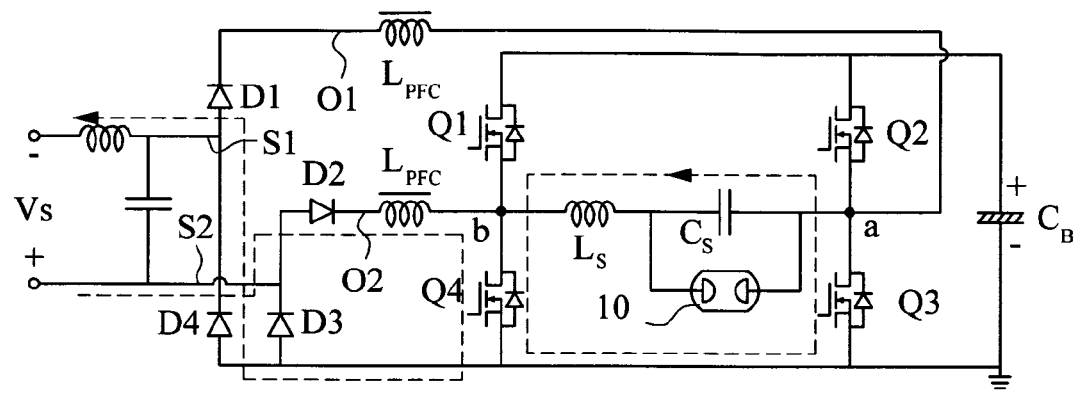
Figure 9F:
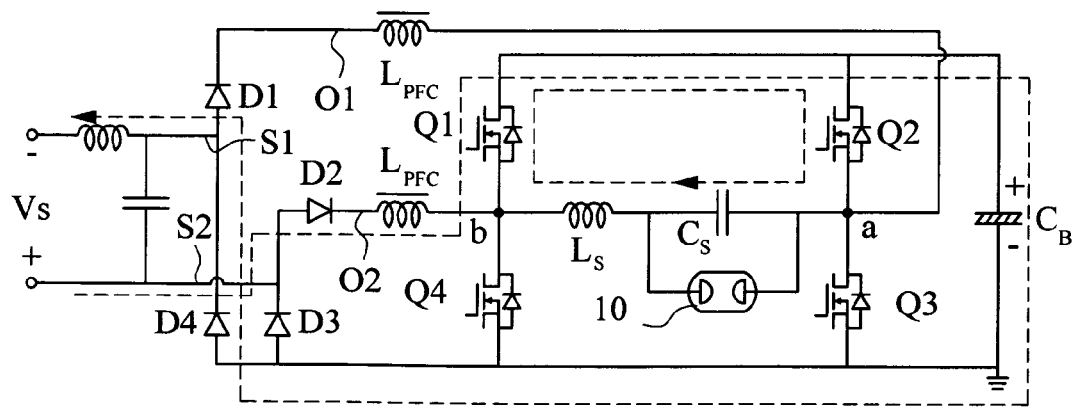
Figure 10A:
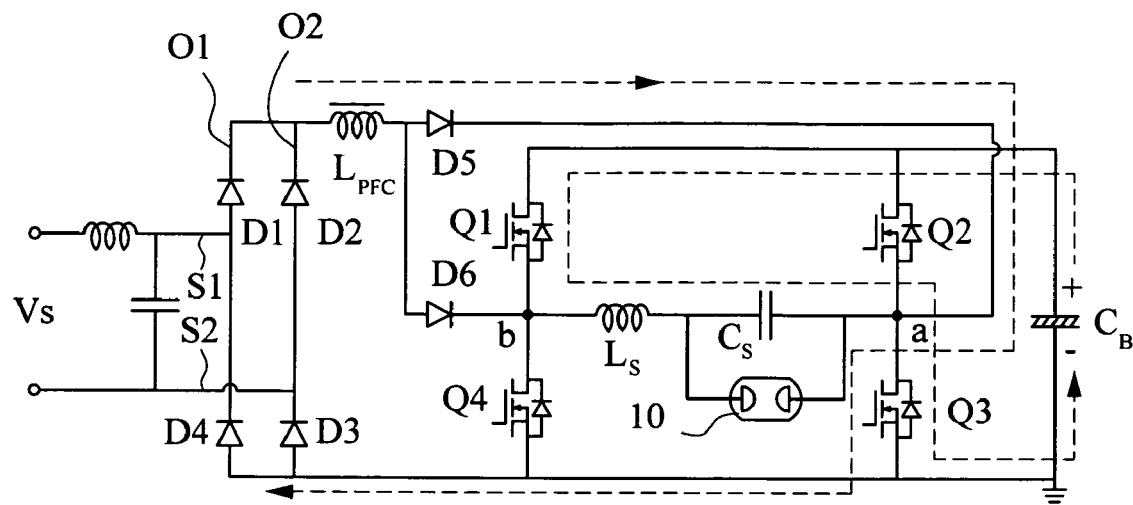
FIGS. 10(a) to 10(f) show the current path of the rectifying and power factor correction unit of the present invention in FIG. 4(b).
Figure 10B:
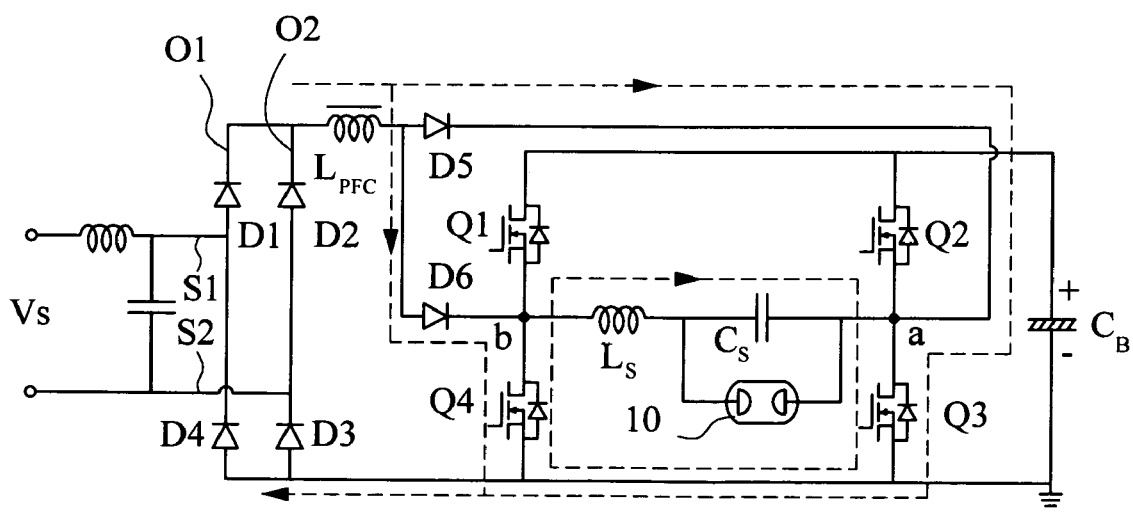
Figure 10C:
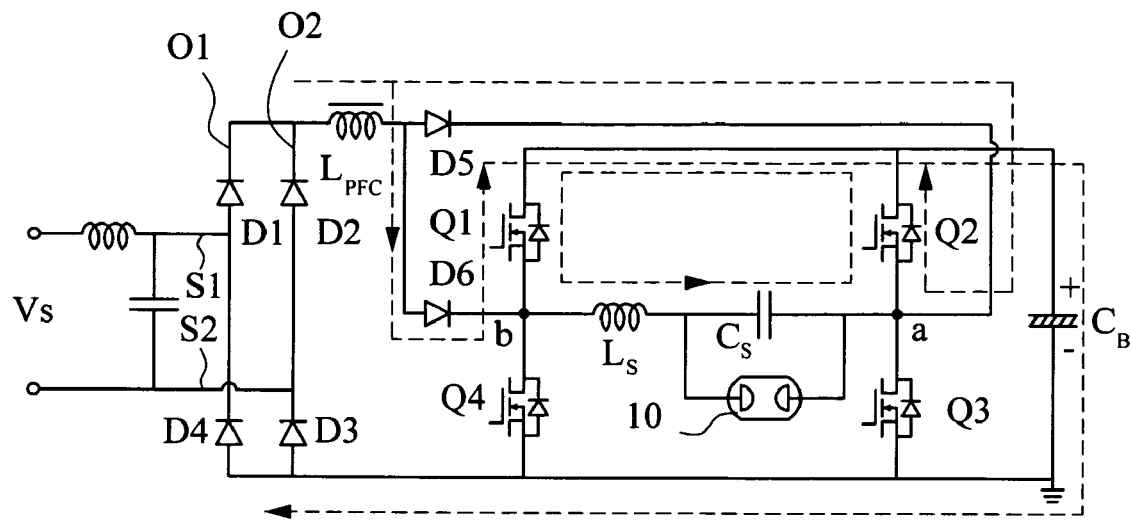
Figure 10D:
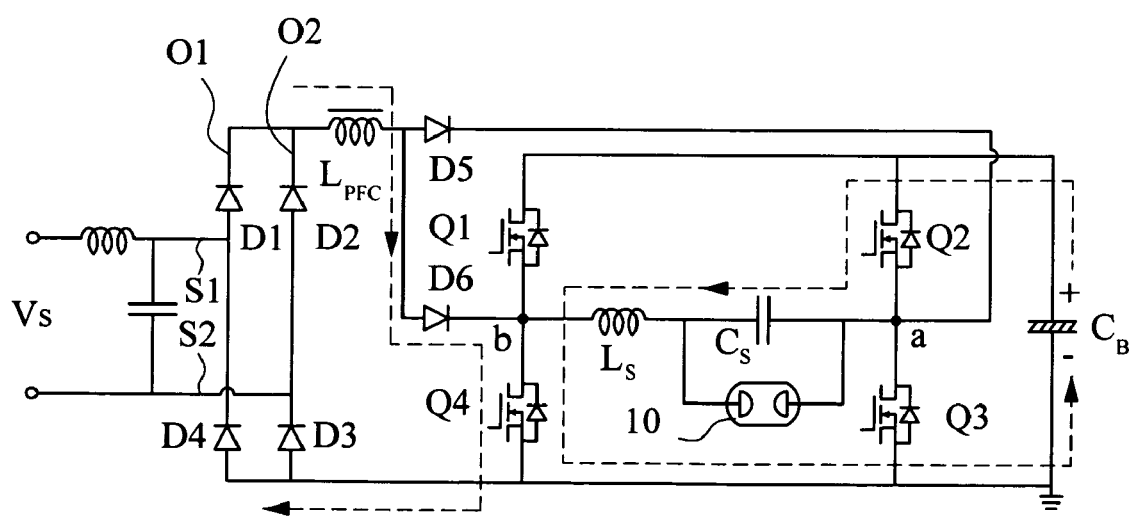
Figure 10E:
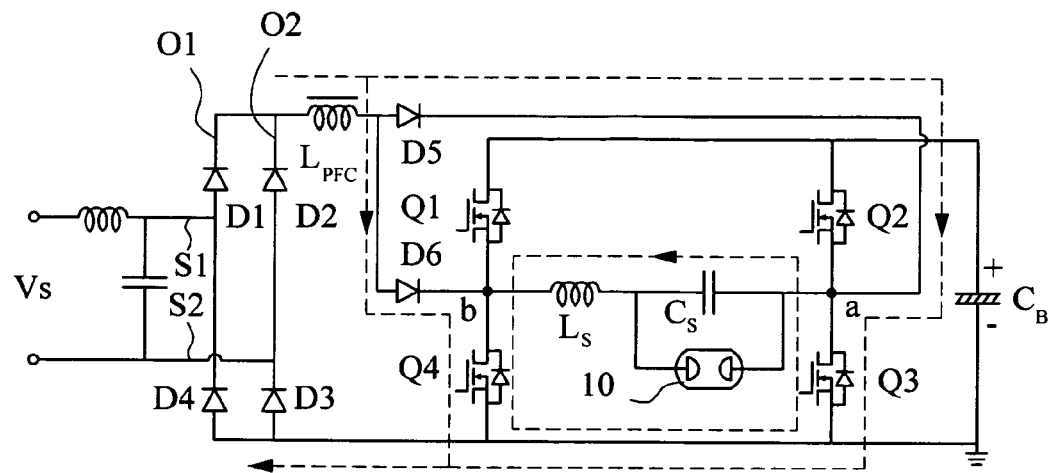
Figure 10F:
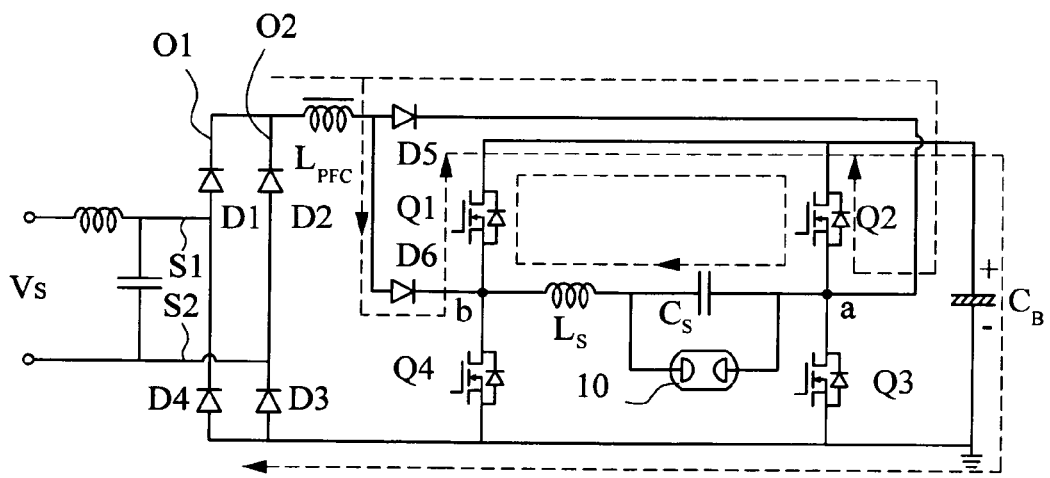
Figure 11A:
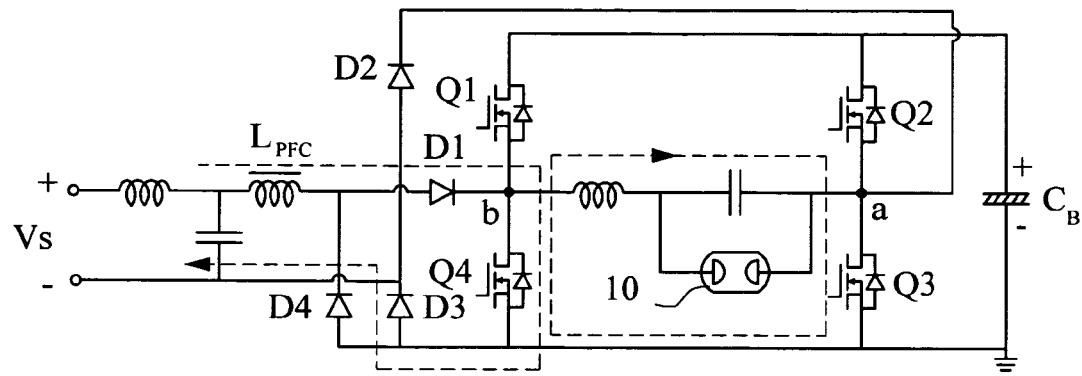
FIGS. 11(a) to 11(f) show the current path of the rectifying and power factor correction unit in FIG. 4(c).
Figure 11B:
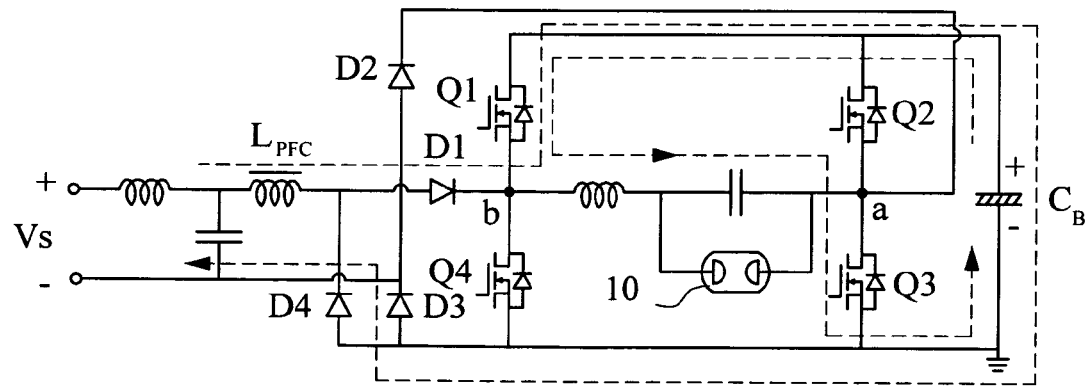
Figure 11C:
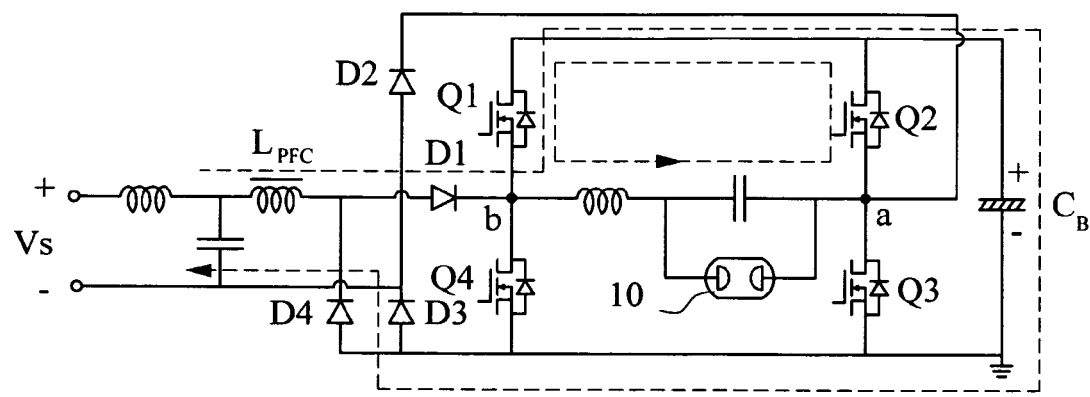
Figure 11D:
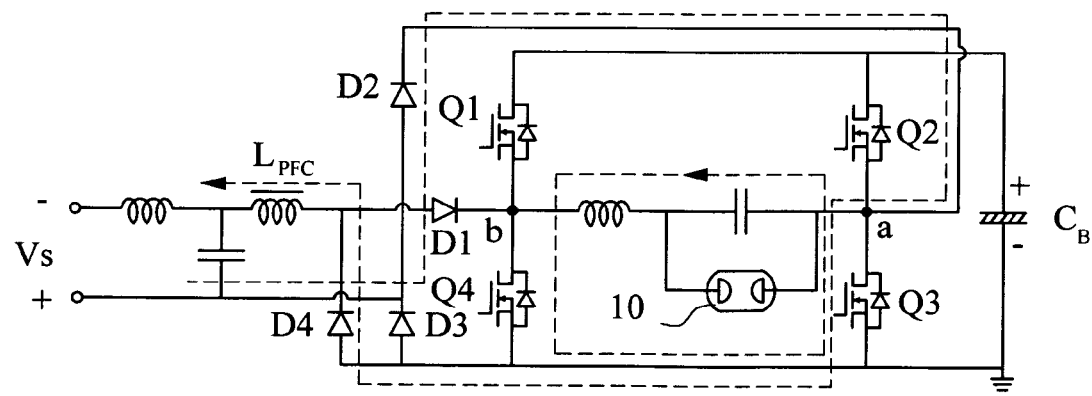
Figure 11E:
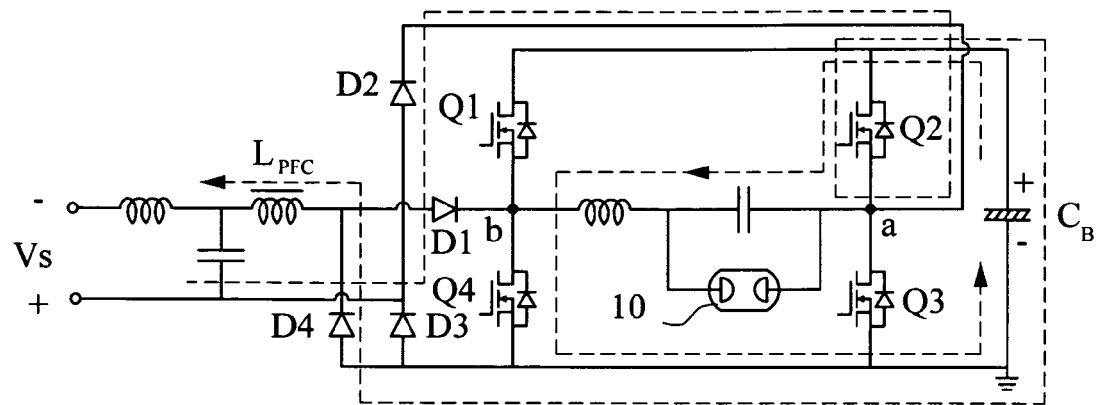
Figure 11F:
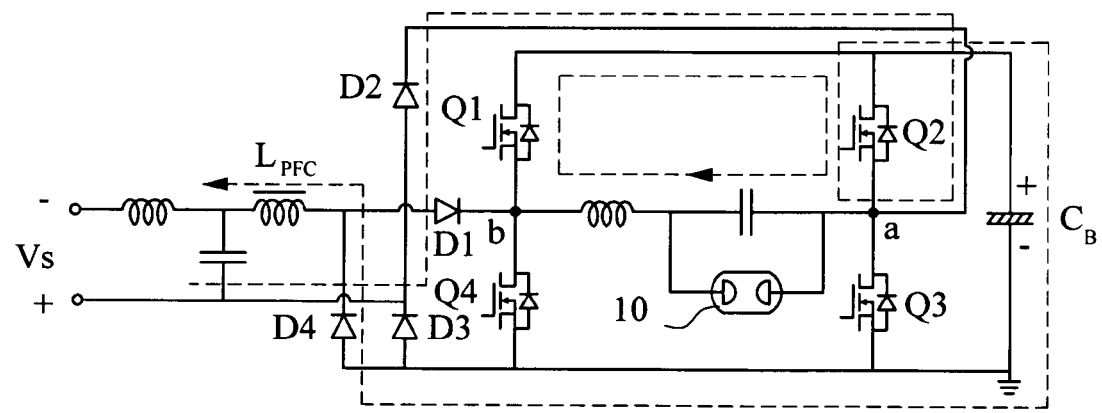
Figure 12A:
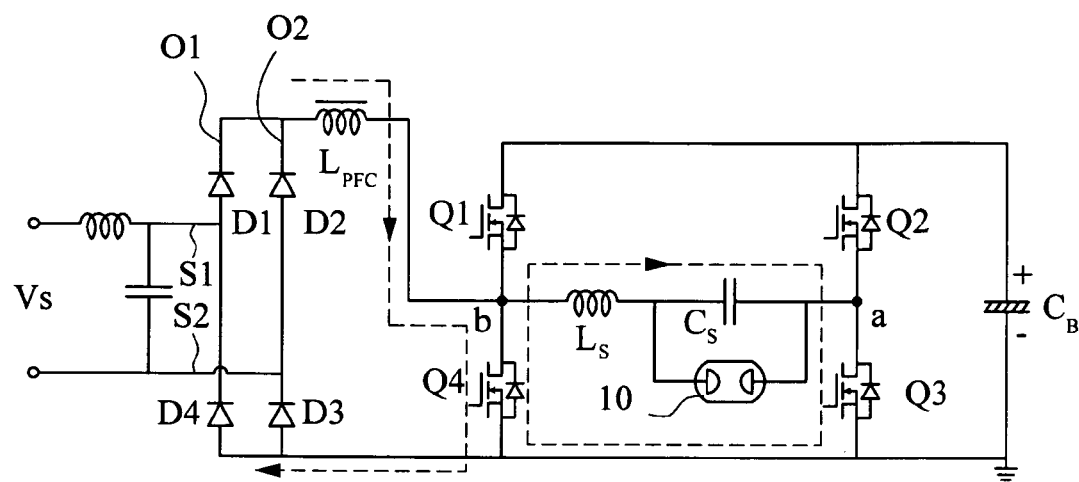
FIGS. 12(a) to 12(f) show the current path of the rectifying and power factor correction unit in FIGS. 4(d) and 4(e).
Figure 12B:
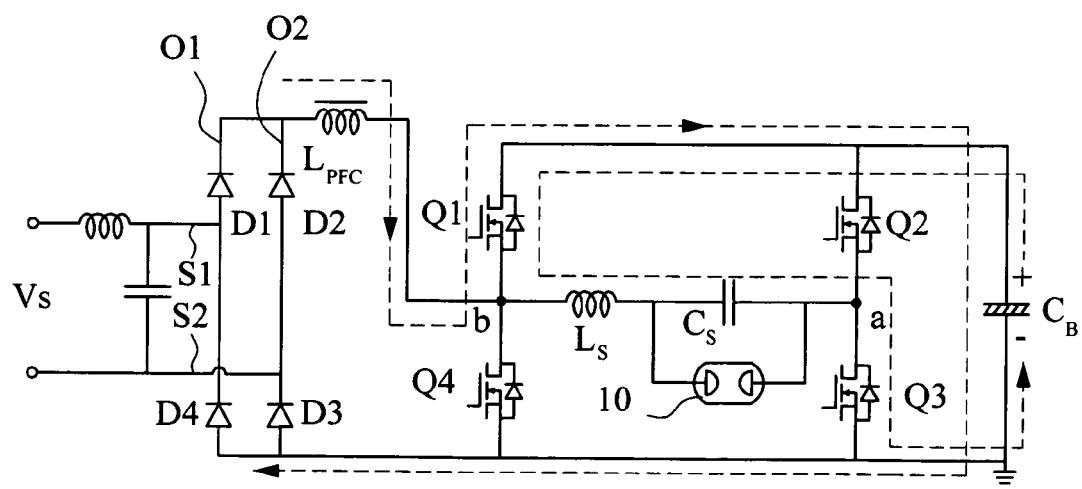
Figure 12C:
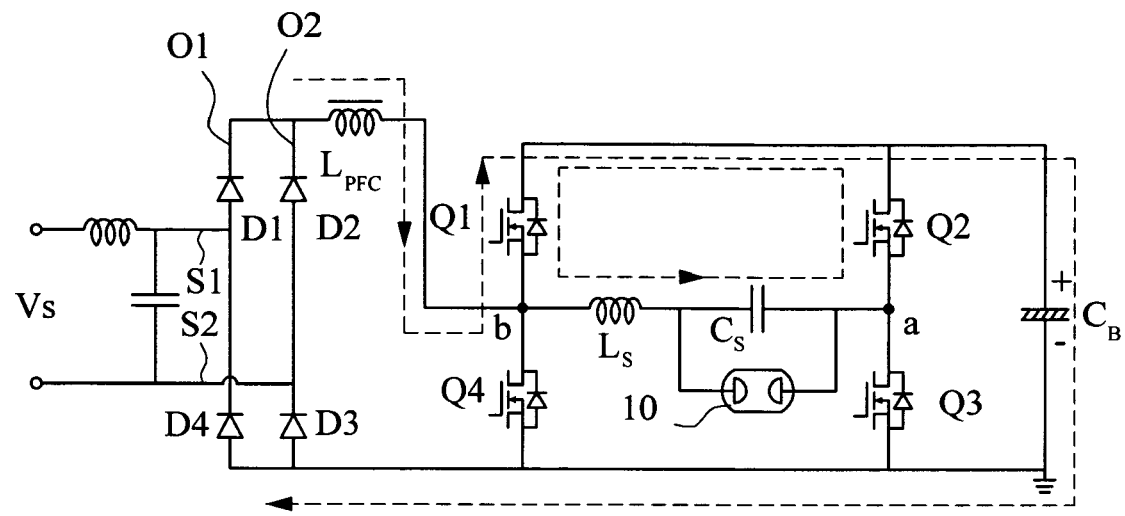
Figure 12D:
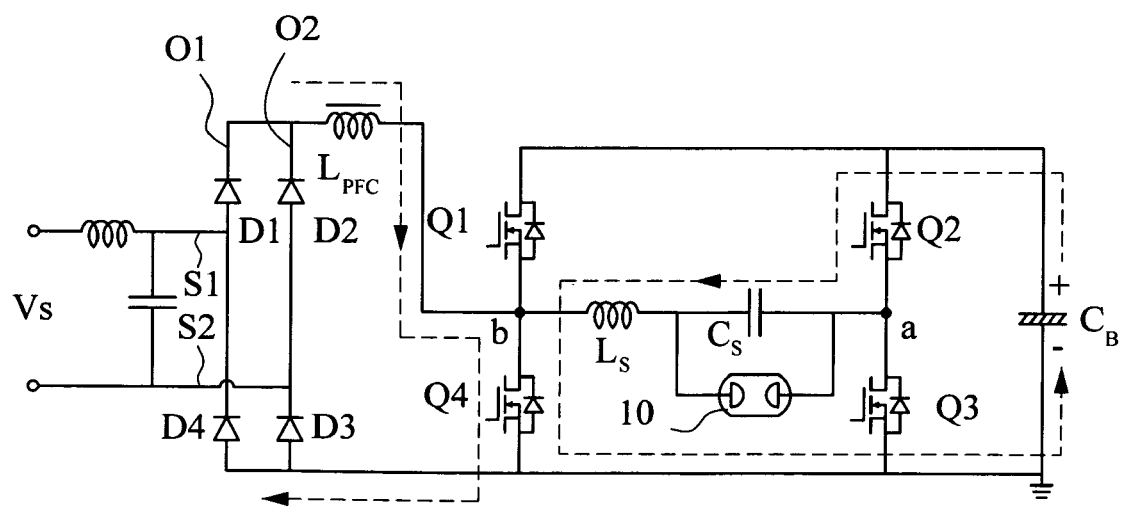
Figure 12E:
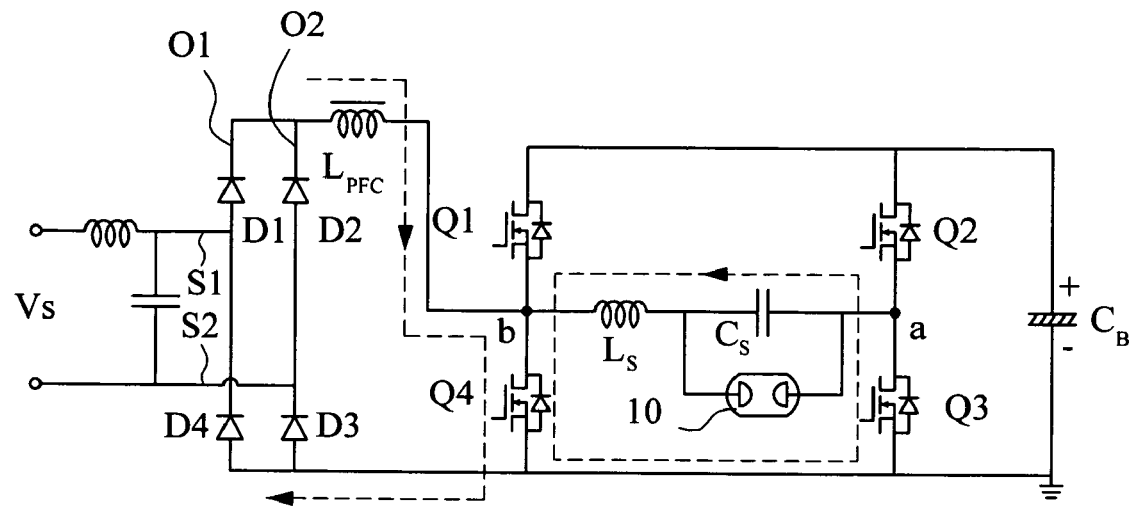
Figure 12F:
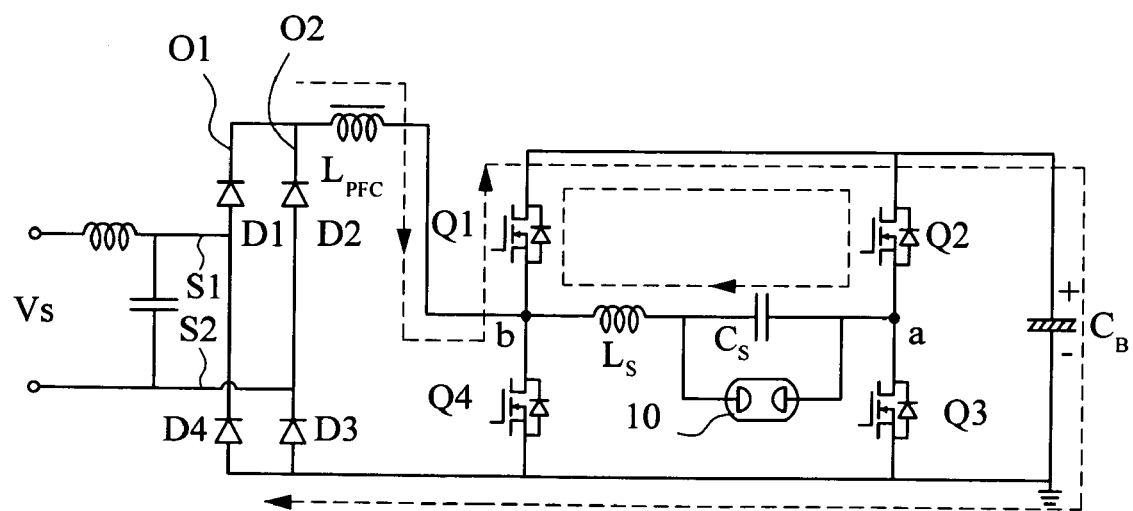

FIG. 7 shows a block diagram of a preferred embodiment of the present invention. FIG. 8 shows the circuit diagram of a preferred embodiment of the present invention. The bridge converter 4 converts DC source to AC low frequency square wave. An output filter 5 is connected between the output load terminals of the bridge converter and the HID lamp 10 to filter off the harmonic current components of output low frequency square wave current.

The rectifying and power factor correction unit 3 is electrically connected to an AC power source and convert the AC power to DC power. The rectifying and power factor correction unit 3 comprises a first rectifier, a second rectifier and at least one energy storing inductor $L_{PFC}$. The first rectifier comprises a first diode D1 in serial connection with a fourth diode D4. The positive (+) terminal of the first diode D1 is connected to the negative (−) terminal of the fourth diode D4. Therefore, a first power source terminal S1 is connected to one terminal of the AC power 1. The negative (−) of the first diode forms a first output terminal O1.

The second rectifier comprises a second diode D2 in serial connection with a third diode D3. The positive (+) terminal of the second diode D2 is connected to the negative (−) terminal of the third diode D3. Therefore, a second power source terminal S2 is formed and connected to another terminal of the AC power 1. The negative (−) of the second diode D2 forms a second output terminal O2. The positive (+) terminals of the fourth diode D4 and the third diode D3 are connected to the common ground terminal.

Figure 4A:
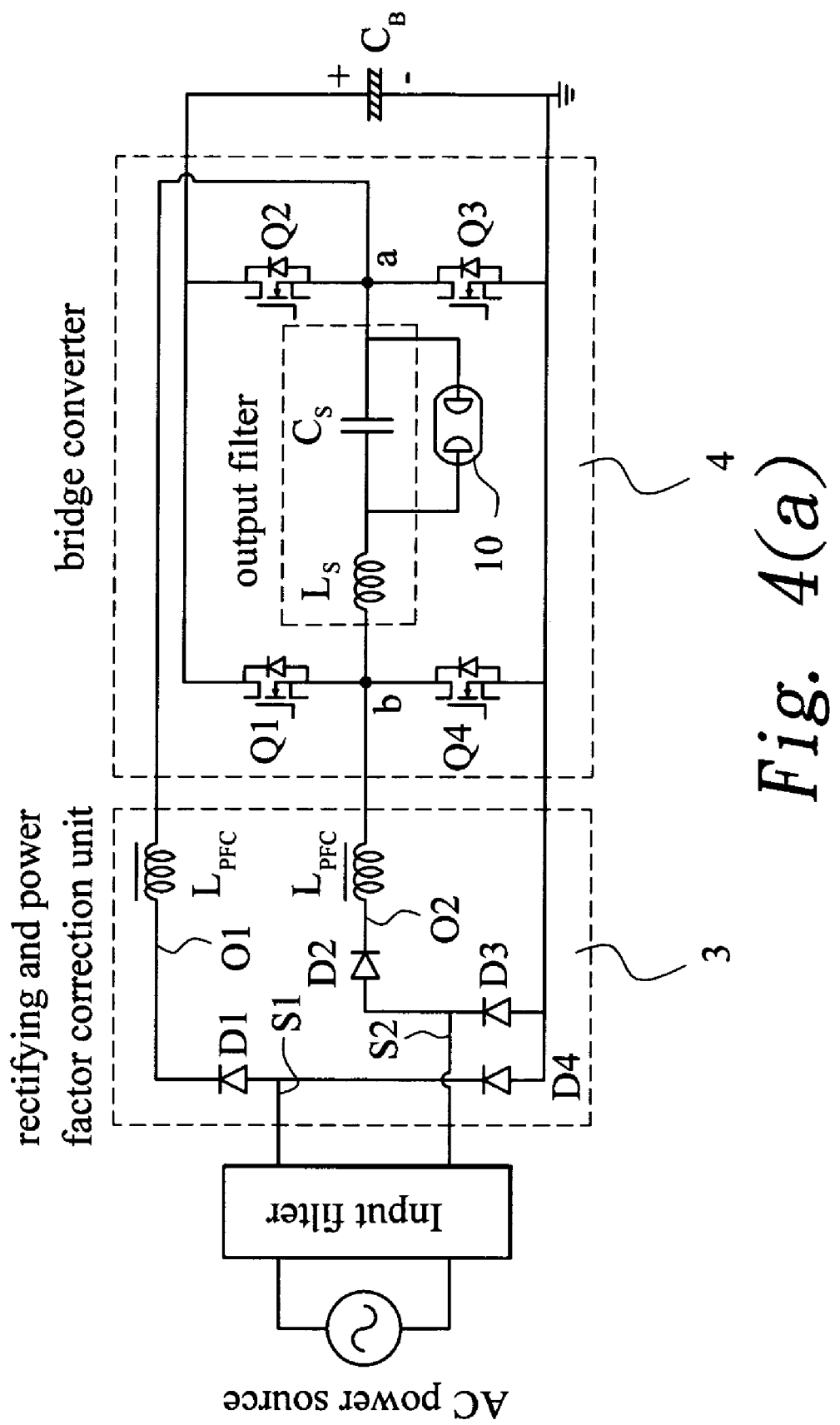
FIGS. 4(a) to 4(e) shows the rectifying and power factor correction circuit according to five preferred embodiments of the present invention.
Figure 4B:
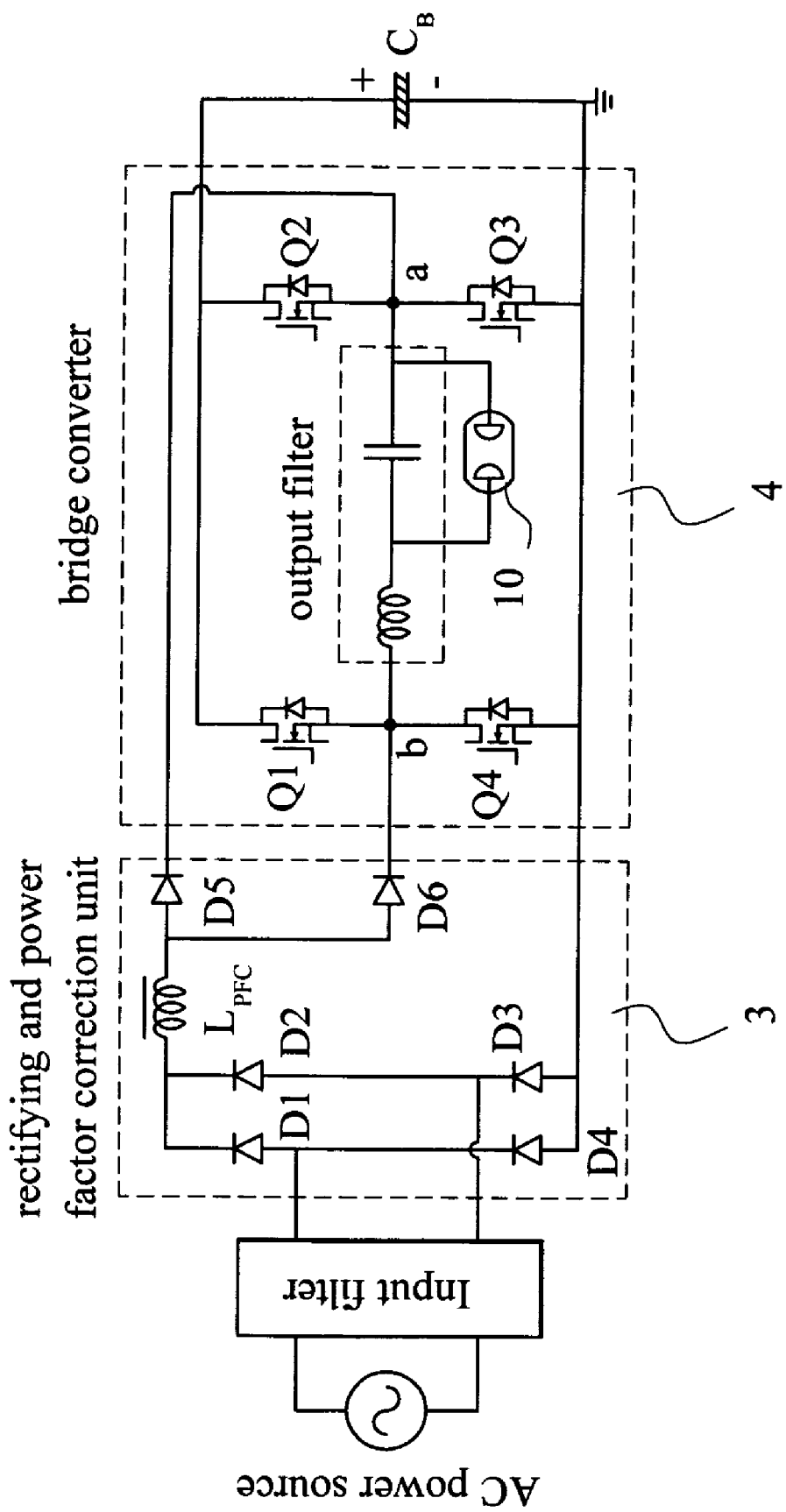
Figure 4C:
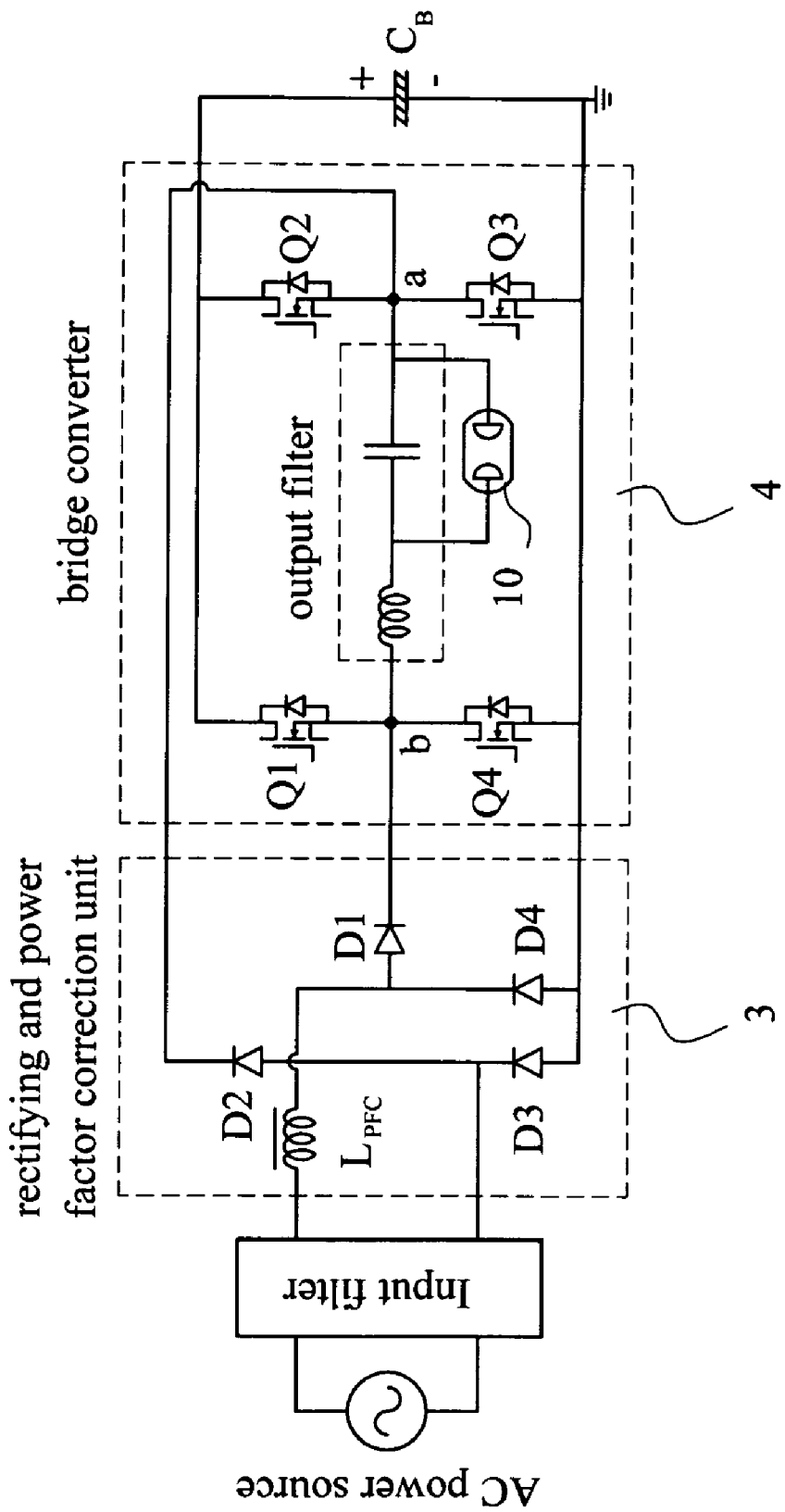
Figure 4D:
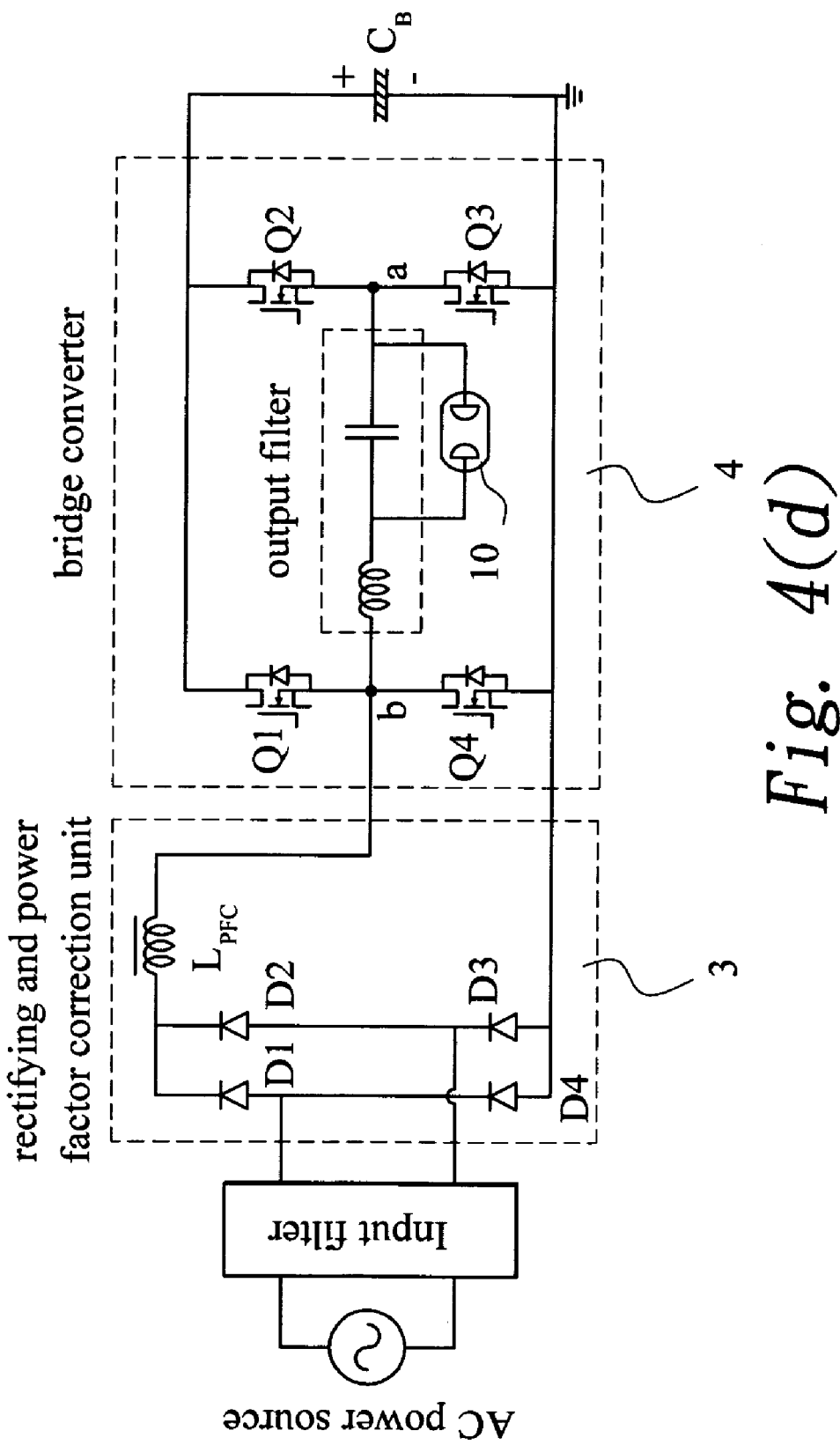
Figure 4E:
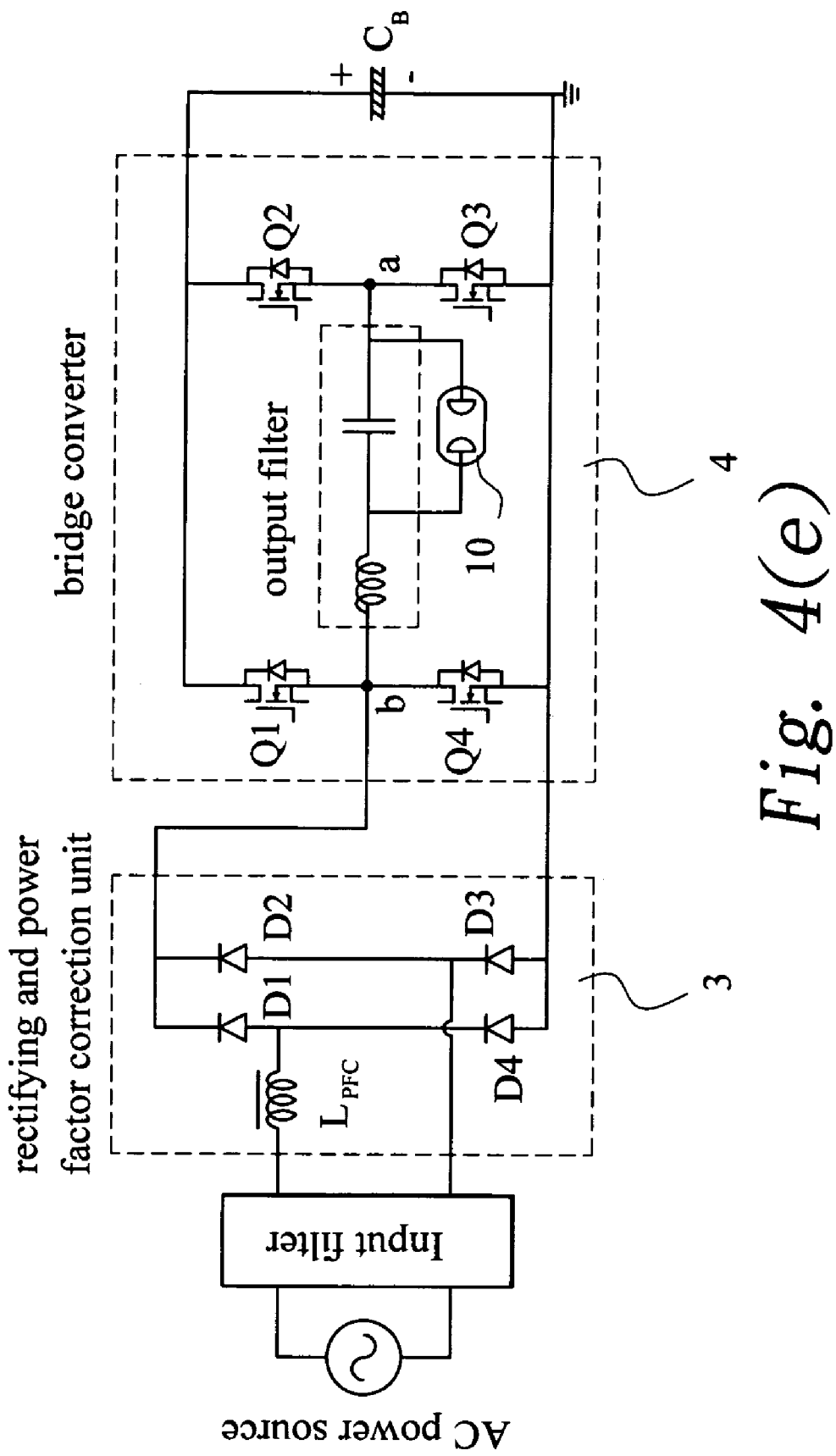
Figure 5:
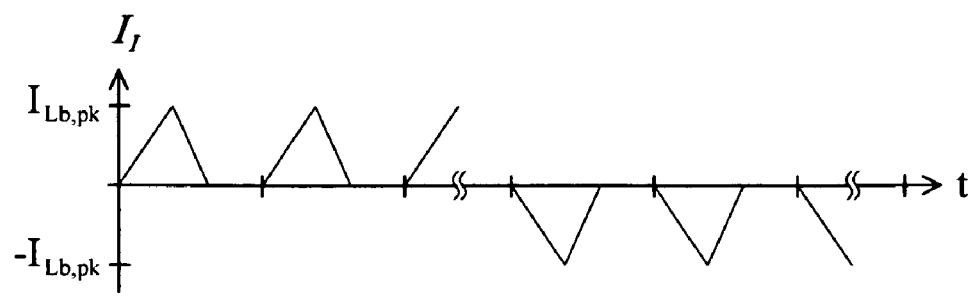
FIG. 5 shows the output current waveform of the input filter of the present invention.

The energy storing inductor $L_{PFC}$ can be connected in series between the first power source terminal S1 and the AC power source, as shown in FIGS. 4(c) and 4(e); or connected in series between the first output terminal O1 and the second load terminal (node b), as shown in FIGS. 4(a) and 4(b); or connected in series between the second output terminal O2 and the first load terminal (node a), as shown in FIGS. 4(a), 4(b) and 4(d).

The first output terminal O1 can be connected to the load terminal (node a) of the bridge converter 4 and/or the second output terminal O2 can be connected to the load terminal (node b) of the bridge converter 4 for power factor correction of the input current, whereby the input current has high power factor. The input filter 2 is connected between the AC power source 1 and the rectifying and power factor correction unit 3 to filter off the harmonic component in the input current. The input filter 2 comprises a filtering inductor Lf and a filtering capacitor Cf in series connection. Both terminals of the filtering capacitor Cf are connected to the first power source terminal and the second power source terminal respectively. The input filter 2 can be connected to the energy storing inductor LPFC firstly and then connected to the first power source terminal S1.

The input terminals of the controller circuit 9 are connected to both terminals of the DC link voltage (both terminals of $C_B$) and the output load terminals. The output terminals of the controller circuit 9 are connected to the four switches Q1-Q4 to drive the four switches Q1-Q4 for pulse width modulation and protection. Therefore, the bridge converter 4 can output low frequency square wave.

The controller circuit 9 comprises a DC bus 6, a first sensor 7, a second sensor 8, a reference voltage generator 91, a first amplifier 92, a second amplifier 93, a first comparator 94, a second comparator 95, a logic circuit 96, a drive 97 and a square wave generator 98.

The DC bus 6 is across the upper and lower arms of the bridge converter 4. The first sensor 7 is connected to the DC bus 6 to sense the DC link voltage. The second sensor 8 is connected to the output terminal to sense the output load current of the bridge converter 4.

The reference voltage generator 91 generates a reference voltage signal and sterminals the reference voltage signal to one of the input terminals of the first comparator 94 and the second comparator 95. The input of the first amplifier 92 is connected to the first sensor 7 to amplify the feedback of the first sensor 7. The input of the second amplifier 93 is connected to the second sensor 8 to amplify the feedback of the second sensor 8.

The first comparator 94 compares the output of the first amplifier 92 and the output of the reference voltage generator 91. The second comparator 93 compares the output of the second amplifier 93 and the output of the reference voltage generator 91, and then sterminals their output signal to the logic circuit 96.

The square wave generator 98 generates a square wave signal and sterminals the square wave signal to the logic circuit 96 to determine the output frequency of the bridge converter 4. The logic circuit 96 sterminals a PWM signal to the drive 97 according to the output signals of the first comparator 94, the second comparator 95 and the square wave generator 98. The PWM signal is sent to the bridge converter 4 after amplification and isolation. Therefore, the switches in the bridge converter 4 can be driven and the bridge converter 4 can be pulse width modulated and protected.

With reference again to FIG. 4(a), in the rectifying and power factor correction unit 3, there are two sets of power factor correction inductors $L_{PFC}$, which are connected in series between the first output terminal O1 and the first load terminal (node a), and between the second output terminal O2 and the second load terminal (node b). FIGS. 9(a) to 9(f) show the current path of the rectifying and power factor correction unit 3. When the AC source is in positive cycle, the first switching unit Q1 and the third switching unit Q3 are turned on. The current flows from the diode D1 to the energy storing inductor $L_{PFC}$ for storing energy and the energy storing current $I_{LB}$ is increased. The current then flows to the load terminal (node a), the switch Q3, the diode D3 and then the AC power source 1. At this time, the discharging current in the DC link capacitor $C_B$ flows to the switch Q1, the load terminal (node b), the HID lamp, the switch Q3 and then back to the DC link capacitor $C_B$. The load voltage between nodes b-a is equal to the DC link voltage $V_B$.

The switches Q3 and Q4 are then turned on and the current thereof flows to the diode D1 and then to the energy storing inductor $L_{PFC}$ for storing energy and the energy storing current $I_{LB}$ is increased. The current then flows to the load terminal (node a), the switch Q3, the diode D3 and then back to the AC power source 1. At this time, the load voltage between nodes b-a is equal to zero because the switches Q3 and Q4 are turned on.

Afterward, the switch Q1 and Q2 are turned on, the current thereof flows to the diode D1, the energy storing inductor $L_{PFC}$, the switch Q2 and the DC link capacitor $C_B$ to charge the DC link capacitor $C_B$. Therefore, the energy storing inductor $L_{PFC}$ is discharged and the current flows to the AC power source 1 through the diode D3. At this time, the load voltage between nodes b-a is equal to zero because the switches Q1 and Q2 are turned on.

When the AC power source 1 is in negative cycle (smaller than zero), the switches Q2 and Q4 are turned on. The current flows to the diode D2 and then the energy storing inductor $L_{PFC}$ for storing energy, where the energy storing current $I_{LB}$ is increased. The current then flows to the load terminal (node b), the switch Q4, the diode D4 and then back to the AC power source 1. At this time, the discharging current of the DC link capacitor $C_B$ flows to the switch Q2, the load terminal (node a), the HID lamp, the switch Q4 and then back to the DC link capacitor CB. The load voltage between nodes b-a is equal to negative DC link voltage ($-V_B$).

Afterward, the switches Q3 and Q4 are turned on, the current firstly flows to the diode D2 and then to the energy storing inductor $L_{PFC}$ for storing energy. The energy storing current $I_{LB}$ keeps increasing and the current flows to load terminal (node b), switch Q4, diode D4 and then back to the AC power source 1. At this time, the load voltage between nodes b-a is equal to zero because the switches Q3 and Q4 are turned on.

The switches Q1 and Q2 are then tuned on and the current flows to the diode D1, the energy storing inductor $L_{PFC}$, the switch Q1 and the DC link capacitor $C_B$ to charge the DC link capacitor $C_B$. Therefore, the energy storing inductor $L_{PFC}$ discharges current to the AC power source through the diode D4. At this time, the load voltage between nodes b-a is equal to zero because the switches Q1 and Q2 are turned on.

With reference to FIG. 4(b), in the rectifying and power factor correction unit 3, the first output terminal O1 of the first rectifier is connected to the second output terminal O2 of the second rectifier to form a bridge rectifier. The bridge rectifier is connected to the energy storing inductor $L_{PFC}$ and the positive (+) terminal of the fifth diode D5 and the positive (+) terminal of the sixth diode D6. The negative (−) terminal of the fifth diode D5 is connected to the first load terminal (node a), and the negative (−) terminal of the sixth diode D6 is connected to the second load terminal (node b). FIGS. 10(a) to 10(f) show the current path of the rectifying and power factor correction unit 3.

When the output current is set in positive cycle, the first switching unit Q1 and the third switching unit Q3 are turned on. The input current flows to the energy storing inductor $L_{PFC}$ for storing energy and the energy storing current $I_{LB}$ is increased. The current then flows to the diode D5, the load terminal (node a), the switch Q3, and then the AC power source 1. At this time, the discharging current in the DC link capacitor $C_B$ flows to the switch Q1, the load terminal (node b), the HID lamp, the switch Q3 and then back to the DC link capacitor $C_B$. The load voltage between points b-a is equal to the DC link voltage $V_B$.

The switches Q3 and Q4 are then turned on and the current thereof flows to the energy storing inductor $L_{PFC}$ for storing energy and the energy storing current $I_{LB}$ is increased. The current then flows to diode D5, the load terminal (node a), the switch Q3, and then back to the AC power source 1. The current also flows to the diode D6, the load terminal (node b), switch Q4, and then back to the AC power source 1. At this time, the load voltage between nodes b-a is equal to zero because the switches Q3 and Q4 are turned on.

Afterward, the switch Q1 and Q2 are turned on, the current thereof flows to the energy storing inductor $L_{PFC}$, the diode D5, the switch Q2 and the DC link capacitor $C_B$ to charge the DC link capacitor $C_B$. The current also flows to the diode D6, the switch Q1 and the DC link capacitor $C_B$ to charge the DC link capacitor $C_B$. Therefore, the energy storing inductor $L_{PFC}$ is discharged. At this time, the load voltage between nodes b-a is equal to zero because the switches Q1 and Q2 are turned on.

When the output current is set in negative cycle (smaller than zero), the switches Q2 and Q4 are turned on. The current flows to the energy storing inductor $L_{PFC}$ for storing energy, where the energy storing current $I_{LB}$ is increased. The current then flows to diode D6, the load terminal (node b), the switch Q4, and then back to the AC power source 1. At this time, the discharging current of the DC link capacitor $C_B$ flows to the switch Q2, the load terminal (node a), the HID lamp, the switch Q4 and then back to the DC link capacitor $C_B$. The load voltage between nodes b-a is equal to negative DC link voltage ($-V_B$).

Afterward, the switches Q3 and Q4 are turned on, the current firstly flows to the energy storing inductor $L_{PFC}$ for storing energy. The energy storing current $I_{LB}$ keeps increasing and the current flows to diode D6, the load terminal (node b), the switch Q4, and then back to the AC power source 1. The current also flows to the diode D5, the load terminal (node a), switch Q3, and then back to the AC power source 1. At this time, the load voltage between nodes b-a is equal to zero because the switches Q3 and Q4 are turned on.

The switches Q1 and Q2 are then tuned on and the current flows to the energy storing inductor $L_{PFC}$, the diode D6, the switch Q1 and the DC link capacitor $C_B$ to charge the DC link capacitor $C_B$. The current also flows to diode D5, switch Q2 and the DC link capacitor $C_B$ to charge the DC link capacitor $C_B$. Therefore, the energy storing inductor $L_{PFC}$ discharges current to the AC power source. At this time, the load voltage between nodes b-a is equal to zero because the switches Q1 and Q2 are turned on.

With reference to FIG. 4(c), in the rectifying and power factor correction unit 3, the energy storing inductor $L_{PFC}$ is in series connected between the input filter 2 and the first power source terminal S1. The first output terminal O1 of the first rectifier is connected to the second load terminal (node b), while the second output terminal O2 of the second rectifier is connected to the first load terminal (node a). FIGS. 11(a) to 11(f) show the current path of the rectifying and power factor correction unit 3.

When the AC current is in positive cycle, the switching unit Q3 and the switching unit Q4 are turned on. The current flows to the energy storing inductor $L_{PFC}$ for storing energy and the energy storing current $I_{LB}$ is increased. The current then flows to the diode D1, the load terminal (node b), the switch Q4, the diode D3 and then the AC power source 1. At this time, the load voltage between nodes b-a is equal to zero because the switching unit Q3 and the switching unit Q4 are turned on.

Afterward, the switches Q1 and Q3 are turned on, the current thereof flows to the energy storing inductor $L_{PFC}$, the diode D1, the load terminal (node b), the switch Q1 and the DC link capacitor $C_B$ to charge the DC link capacitor $C_B$. The current flows to the diode 3, and then back to the AC power source 1 to discharge the energy storing inductor $L_{PFC}$. At this time the discharging current of the DC link capacitor $C_B$ also flows to the switch Q1, the load terminal (node b) and the HID lamp, the switch Q3 and the DC link capacitor $C_B$. The load voltage between nodes b-a is equal to DC link voltage (VB).

Afterward, the switch Q1 and Q2 are turned on, the current thereof flows to the energy storing inductor $L_{PFC}$, the diode D1, the switch Q1 and the DC link capacitor $C_B$ to charge the DC link capacitor $C_B$. Then the current flows to the diode D3 and back to the AC power source 1, this current discharging the energy storing inductor $L_{PFC}$ until the energy stored in the energy storing inductor $L_{PFC}$ is entirely discharged. At this time, the load voltage between nodes b-a is equal to zero because the switches Q1 and Q2 are turned on.

When the AC power source 1 is in negative cycle, the switches Q3 and Q4 are turned on. The current flows to the energy storing inductor $L_{PFC}$ for storing energy, where the energy storing current $I_{LB}$ is increased. The current then flows to diode D2, the load terminal (node a), the switch Q3, the diode D4 and then back to the AC power source 1. At this time, the load voltage between nodes b-a is equal to zero because the switches Q3 and Q4 are turned on.

Afterward, the switches Q2 and Q4 are turned on, the current flows to the energy storing inductor $L_{PFC}$, the diode D2, the load terminal (node a), the switch Q2 and the DC link capacitor $C_B$ to charge the DC link capacitor $C_B$. The current flows to the diode D4 and then back to the AC power source 1 to discharge the energy storing inductor $L_{PFC}$. The discharging current of the DC link capacitor $C_B$ also flows to the switch Q2, the load terminal (node a), the HID lamp, the switch Q4 and the DC link capacitor $C_B$. The load voltage between nodes b-a is equal to negative DC link voltage ($-V_B$).

Afterward, the switches Q1 and Q2 are then tuned on and the current flows to the energy storing inductor $L_{PFC}$, the diode D2, the switch Q2 and the DC link capacitor $C_B$ to charge the DC link capacitor $C_B$. Then the current flows to diode D4 and back to the AC power source 1, this current discharging the energy storing inductor $L_{PFC}$ until the energy of the energy storing inductor $L_{PFC}$ is completely discharged. At this time, the load voltage between nodes b-a is equal to zero because the switches Q1 and Q2 are turned on.

The circuit in FIGS. 4(a) and 4(c) are different in that the energy storing inductor $L_{PFC}$ is connected in front of or after the rectifying diode and the power polarity. Therefore, their operations can be referred to each other.

With reference to FIGS. 4(d) and 4(e), the first output terminal O1 of the first rectifier is connected to the second output terminal O2 of the second rectifier to form a bridge rectifier. The operation principles are similar when the energy storing inductor $L_{PFC}$ is connected in front of or after the bridge rectifier, or connected to the first load terminal (node a) or the second load terminal (node b). Therefore, the present invention is exemplified with the circuit in FIG. 4(d), where the energy storing inductor $L_{PFC}$ is connected after the bridge rectifier and the energy storing inductor $L_{PFC}$ is connected in series to the second load terminal (node b). The current path is shown in FIGS. 12(a)-12(f).

When the load current is set in positive cycle, the switching unit Q3 and the switching unit Q4 are turned on. The input current flows to the energy storing inductor $L_{PFC}$ for storing energy and the energy storing current $I_{LB}$ is increased. The current then flows to load terminal (node b), switch Q4, and then the AC power source 1. At this time, the load voltage between nodes b-a is equal to zero because the switching unit Q3 and the switching unit Q4 are turned on.

Afterward, the switch Q1 and Q3 are turned on, the input current thereof flows to the energy storing inductor $L_{PFC}$, the load terminal (node b), switch Q1 and the DC link capacitor $C_B$ to charge the DC link capacitor $C_B$. The current then flows back to the AC power source 1, to discharge the energy storing inductor $L_{PFC}$. The discharge current of the DC link capacitor $C_B$ also flows to the switch Q1, the load terminal (node b) and then to the HID lamp, the switch Q3 and then the DC link capacitor $C_B$. Therefore, the load voltage between nodes b-a is equal to the voltage $V_B$ of the DC link capacitor $C_B$.

The switches Q1 and Q2 are then tuned on and the current flows to the energy storing inductor $L_{PFC}$, the diode D2, the switch Q2 and the DC link capacitor $C_B$ to charge the DC link capacitor $C_B$. Then the current also flows to diode D4, the AC power source 1 to discharge the energy storing inductor $L_{PFC}$ until the energy of the energy storing inductor $L_{PFC}$ is completely discharged. At this time, the load voltage between nodes b-a is equal to zero because the switches Q1 and Q2 are turned on.

When the load current is set in negative cycle, the switches Q2 and Q4 are turned on. The current flows to the energy storing inductor $L_{PFC}$ for storing energy, where the energy storing current $I_{LB}$ is increased. The current then flows to load terminal (node b), switch Q4, and then back to the AC power source 1. The discharge current of the DC link capacitor $C_B$ will flow to the switch Q2, the load terminal (node a), the HID lamp, the switch Q4 and then back to the DC link capacitor CB. The load voltage between nodes b-a is equal to negative DC link voltage ($-V_B$).

The switches Q3 and Q4 are then tuned on and the input current flows to the energy storing inductor $L_{PFC}$, the load terminal (node b), the switch Q4 and the AC power source 1, wherein the energy storing current $I_{LB}$ is increased. At this time, the load voltage between nodes b-a is equal to zero because the switches Q3 and Q4 are turned on.

The switches Q1 and Q2 are then tuned on and the input current flows to the energy storing inductor $L_{PFC}$, the load terminal (node b), the switch Q1 and the DC link capacitor $C_B$ to charge the DC link capacitor $C_B$. The current then flows back to the AC power source 1 to discharge the energy storing inductor $L_{PFC}$ until the energy in the energy storing inductor $L_{PFC}$ is exhausted. At this time, the load voltage between nodes b-a is equal to zero because the switches Q1 and Q2 are turned on.

As to output power control, the averaged output voltage is proportional to the turning on time ratio of Q1 and Q3, as well as Q2 and Q4. Therefore, output power can be controlled by controlling this on time ratio. As to input power control, the input current and power increase when the turning on ratio of Q3 and Q4 increases and the turning on ratio of Q1 and Q2 decreases, while the output power is not influenced. Therefore, the input power and the output power can be controlled indepterminalently.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A rectifying and power factor correction unit with input connected to an AC power source and output connected to a first load terminal and a second load terminal of a bridge converter for converting an AC power into a DC power, said rectifying and power factor correction unit serving as an energy storing unit for driving an HID lamp and, comprising:

a first rectifier comprising a first diode in serial connection with a fourth diode, a positive end of the first diode connected to a negative end of the fourth diode, a first power source terminal formed and connected to one end of the AC power and a negative end of the first diode forming a first output terminal;

a second rectifier comprising a second diode in serial connection with a third diode, a positive end of the second diode connected to a negative end of the third diode, a second power source terminal formed and connected to another end of the AC power, a negative end of the second diode forming a second output end, a positive end of the fourth diode and a positive end of the third diode connected to a common ground end; and at least one energy storing inductor LPFC connected in series between the first power source terminal and the AC power source, or connected in series between the first output terminal and the second load terminal of the bridge converter, or connected in series between the second output terminal and the first load terminal of the bridge converter, wherein the bridge converter comprises first, second, third and fourth switching units to form arms of a full bridge, the connection node of the first switching unit and the fourth switching unit forming a first load terminal, the connection node of the second switching unit and the third switching unit forming a second load terminal, the connection node of the first switching unit and the second switching unit connected to a positive node (+) of a DC link capacitor, the connection node of the third switching unit and the fourth switching unit connected to a negative node (−) of the DC link capacitor and being a common ground terminal.

2. The rectifying and power factor correction unit as in claim 1, wherein the energy storing inductor $L_{PFC}$ has two sets, one connected in series between the first output terminal and the second load terminal; and the other one connected in series between the second output terminal and the first load terminal.

3. The rectifying and power factor correction unit as in claim 1, wherein the first output terminal of the first rectifier is directly connected to the first load terminal, the second output terminal of the second rectifier is directly connected to the second load terminal.

4. The rectifying and power factor correction unit as in claim 1, wherein the first output terminal of the first rectifier is connected to the second output terminal of the second rectifier and then connected to the first or second load terminal.

5. The rectifying and power factor correction unit as in claim 1, wherein the first output terminal of the first rectifier is connected to the second output terminal of the second rectifier and then connects the energy storing inductor $L_{PFC}$ to the first or second load terminal.

6. The rectifying and power factor correction unit as in claim 1, wherein the first output terminal of the first rectifier is connected to the second output terminal of the second rectifier, and then connected to a energy storing inductor, the energy storing inductor then connects a fifth diode to the second load terminal in series, and also connects a sixth diode to the first load terminal in series.

7. The rectifying and power factor correction unit as in claim 1, further comprising an input filter connected between the AC power source and first rectifier and the second rectifier.

8. The rectifying and power factor correction unit as in claim 7, wherein the input filter is connected in series with the energy storing inductor $L_{PFC}$ and the first power source terminal.

* * * * *